(12) United States Patent
Ouyang

(10) Patent No.: US 12,199,494 B2
(45) Date of Patent: Jan. 14, 2025

(54) LOCKING ASSEMBLY FOR A PROPELLER ROTOR OF AN AIRCRAFT, A ROTOR ASSEMBLY FOR THE AIRCRAFT, AND A METHOD

(71) Applicant: The Boeing Company, Chicago, IL (US)

(72) Inventor: Wen Ouyang, Cary, NC (US)

(73) Assignee: The Boeing Company, Arlington, VA (US)

( * ) Notice: Subject to any disclaimer, the term of this patent is extended or adjusted under 35 U.S.C. 154(b) by 237 days.

(21) Appl. No.: 18/061,212

(22) Filed: Dec. 2, 2022

(65) Prior Publication Data
US 2024/0186879 A1 Jun. 6, 2024

(51) Int. Cl.
| | |
|---|---|
| *H02K 7/14* | (2006.01) |
| *B64C 27/30* | (2006.01) |
| *B64C 29/00* | (2006.01) |
| *H01F 7/02* | (2006.01) |
| *H02K 1/06* | (2006.01) |
| *H02K 7/00* | (2006.01) |
| *H02K 99/00* | (2014.01) |

(52) U.S. Cl.
CPC .............. *H02K 99/20* (2016.11); *B64C 27/30* (2013.01); *B64C 29/0025* (2013.01); *H01F 7/02* (2013.01); *H02K 1/06* (2013.01); *H02K 7/006* (2013.01); *H02K 7/14* (2013.01)

(58) Field of Classification Search
CPC ..... B64C 27/30; B64C 29/0025; B64U 50/19; H01F 7/02; H02K 1/06; H02K 7/006; H02K 7/14; H02K 99/20; Y02E 10/543
See application file for complete search history.

(56) References Cited

U.S. PATENT DOCUMENTS

| | | | |
|---|---|---|---|
| 11,305,871 B2 * | 4/2022 | Heafitz | B64C 27/463 |
| 2020/0207469 A1 * | 7/2020 | Benedict | B64U 30/297 |
| 2022/0181931 A1 * | 6/2022 | Li | B64C 11/00 |

FOREIGN PATENT DOCUMENTS

EP 1342664 B1 * 7/2005 ............. B64C 25/26

OTHER PUBLICATIONS

EP-1342664-B1, Collecto, all pages (Year: 2005).*
KDE Direct website https://www.kdedirect.com/products/kde-cf185-dp; accessed Dec. 2, 2022; 9 pages.

* cited by examiner

*Primary Examiner* — Naishadh N Desai
(74) *Attorney, Agent, or Firm* — Hanley, Flight & Zimmerman, LLC

(57) ABSTRACT

A locking assembly for a propeller rotor includes an electric machine having a first mode to energize the electric machine to produce torque and a second mode to deenergize the electric machine to stop production of the torque. A magnetic assembly includes a first component coupled to a first wall via a pivot point, and a second component attached to a second wall. The first component and the second component align proximal to each other when the first component is in a locked position such that the first and second components create a magnetic attraction therebetween to lock the first wall in a stationary position when the electric machine is in the second mode. The first component moves away from the second component to an unlocked position due to rotation of the first wall when the electric machine is in the first mode.

20 Claims, 11 Drawing Sheets

LOCKING ASSEMBLY FOR A PROPELLER ROTOR OF AN AIRCRAFT, A ROTOR ASSEMBLY FOR THE AIRCRAFT, AND A METHOD

BACKGROUND

A vertical take-off and landing (VTOL) aircraft is a type of aircraft that can take off, hover, and land vertically. A VTOL aircraft generally includes one or more rotors that support respective propeller(s) that produce vertical lift by rotating the propeller(s). Some VTOL aircraft also have fixed-wings that generate lift when the aircraft is propelled forward by one or more propeller(s), jet engine(s), etc. When the fixed-wing aircraft transverses from vertical flight to horizontal or wing-borne flight, the rotors that produce vertical lift are turned off to stop rotation of the respective propeller(s). However, when the rotors that produced vertical lift are shut off, the propellers of those rotors are free to spin due to airflow across those propellers during wing-borne flight. That is, the rotors that are shut off may free-wheel which allows the corresponding propellers to free-wheel, and this free-wheeling can produce drag and hinder efficiency of wing-borne flight.

SUMMARY

Therefore, it is desirable to develop a locking assembly, a rotor assembly, and associated method, that locks one or more rotors in place to prevent free-wheel of the rotors when the rotors are stationary during wing-borne flight.

The present disclosure provides for a locking assembly for a propeller rotor of an aircraft. The locking assembly includes an electric machine having a first mode to energize the electric machine to produce torque and a second mode to deenergize the electric machine to stop production of the torque. The electric machine includes a first wall rotatable about a longitudinal axis when the electric machine is in the first mode. The first wall becomes stationary relative to the longitudinal axis when the electric machine is in the second mode. The electric machine includes a second wall spaced apart from the first wall and the second wall is stationary relative to the first wall regardless of the electric machine being in the first mode or the second mode. The locking assembly includes a magnetic assembly, and the magnetic assembly includes a first component coupled to the first wall via a pivot point. The magnetic assembly also includes a second component attached to the second wall. The first component is movable relative to the pivot point to a locked position and an unlocked position. The first component and the second component align proximal to each other when the first component is in the locked position such that the first component and the second component create a magnetic attraction therebetween to lock the first wall in a stationary position when the electric machine is in the second mode. The first component moves away from the second component to the unlocked position due to rotation of the first wall when the electric machine is in the first mode.

The present disclosure also provides for a rotor assembly for an aircraft. The rotor assembly includes a propeller rotor selectively rotatable about a longitudinal axis, and includes a locking assembly coupled to the propeller rotor. The locking assembly is configured to selectively lock the propeller rotor in a stationary position. The locking assembly includes an electric machine coupled to the propeller rotor. The electric machine has a first mode to energize the electric machine to produce torque to drive rotation of the propeller rotor and a second mode to deenergize the electric machine to stop production of the torque which causes rotation of the propeller rotor to stop. The electric machine includes a first wall coupled to the propeller rotor such that the first wall and the propeller rotor are rotatable together about the longitudinal axis when the electric machine is in the first mode. The first wall and the propeller rotor become stationary relative to the longitudinal axis when the electric machine is in the second mode. The electric machine includes a second wall spaced apart from the first wall and the second wall is stationary relative to the first wall regardless of the electric machine being in the first mode or the second mode. The locking assembly also includes a magnetic assembly, and the magnetic assembly includes a first component coupled to the first wall via a pivot point. The magnetic assembly also includes a second component attached to the second wall. The first component is movable relative to the pivot point to a locked position and an unlocked position. The first component and the second component align proximal to each other when the first component is in the locked position such that the first component and the second component create a magnetic attraction therebetween to lock the first wall and the propeller rotor in the stationary position when the electric machine is in the second mode. The first component moves away from the second component to the unlocked position due to rotation of the first wall when the electric machine is in the first mode.

The present disclosure further provides for a method of controlling a propeller rotor of an aircraft. An electric machine is signaled, via a controller, to operate in a first mode to produce torque to drive rotation of the propeller rotor. The electric machine includes a first wall coupled to the propeller rotor such that the first wall and the propeller rotor are rotatable together about a longitudinal axis when the electric machine is in the first mode. The electric machine is signaled, via the controller, to operate in a second mode to deenergize the electric machine to stop production of the torque which causes rotation of the propeller rotor to stop. The first wall and the propeller rotor become stationary relative to the longitudinal axis when the electric machine is in the second mode. The electric machine includes a second wall spaced apart from the first wall and the second wall is stationary relative to the first wall regardless of the electric machine being in the first mode or the second mode. A locking assembly is operated to selectively lock the propeller rotor in a stationary position such that a first component of a magnetic assembly and a second component of the magnetic assembly align proximal to each other when the first component is in a locked position in which the first component and the second component create a magnetic attraction therebetween to lock the first wall and the propeller rotor in the stationary position when the electric machine is in the second mode. The first component moves away from the second component to an unlocked position due to rotation of the first wall when the electric machine is in the first mode. The first component is coupled to the first wall via a pivot point and movable relative to the pivot point to the locked position and the unlocked position. The second component is attached to the second wall.

The detailed description and the drawings or FIGS. are supportive and descriptive of the disclosure, but the claim scope of the disclosure is defined solely by the claims. While some of the best modes and other configurations for carrying out the claims have been described in detail, various alter-

Figure 1:
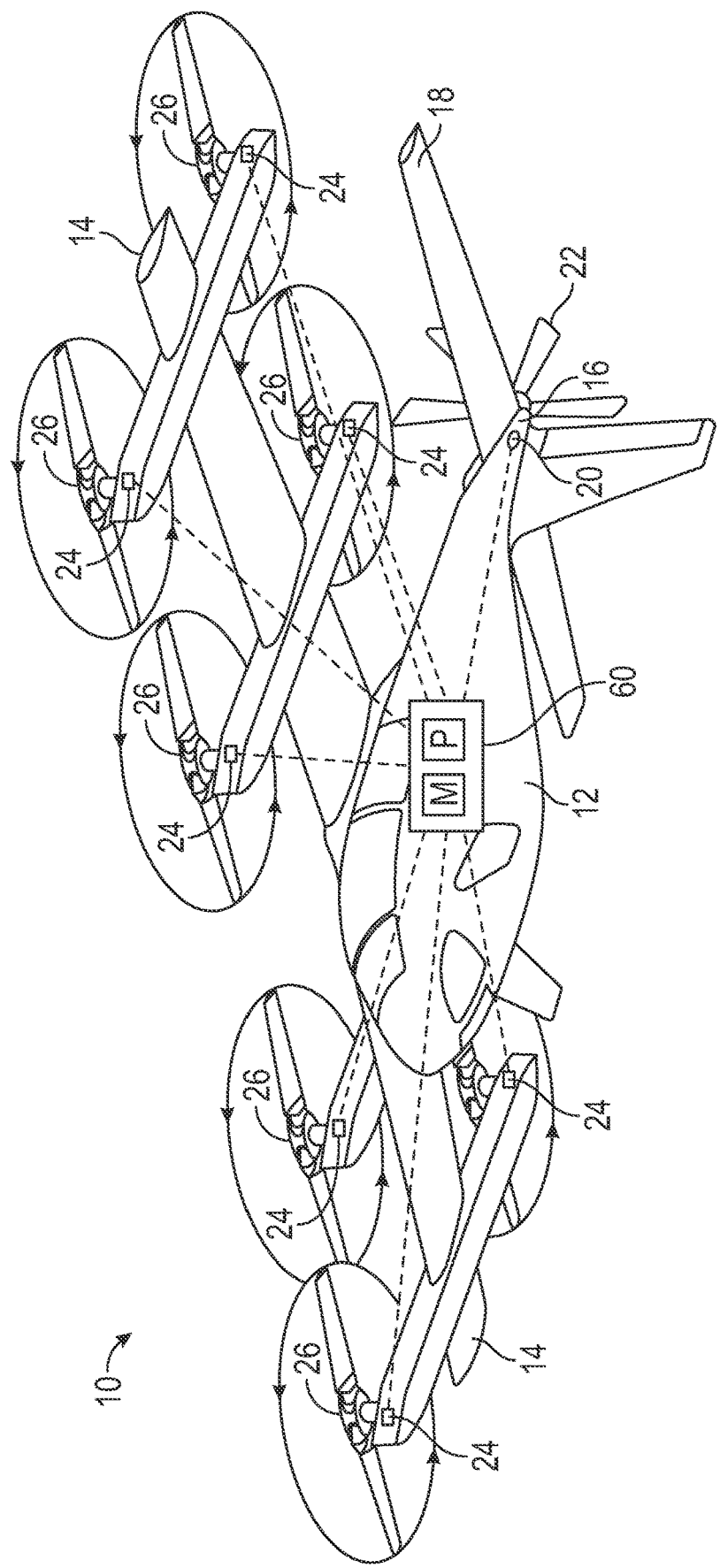
FIG. 1 is a schematic illustration of an aircraft in a hover phase, with a plurality of auxiliary propellers rotating relative to a plurality of wings when the hover phase.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first," "second," "third," and so on, may be used to describe separate components. Such terminology may include the words specifically mentioned above, derivatives thereof, and words of similar import. Furthermore, the term "substantially" can refer to a slight imprecision or slight variance of a condition, quantity, value, or dimension, etc., some of which that are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Figure 2:
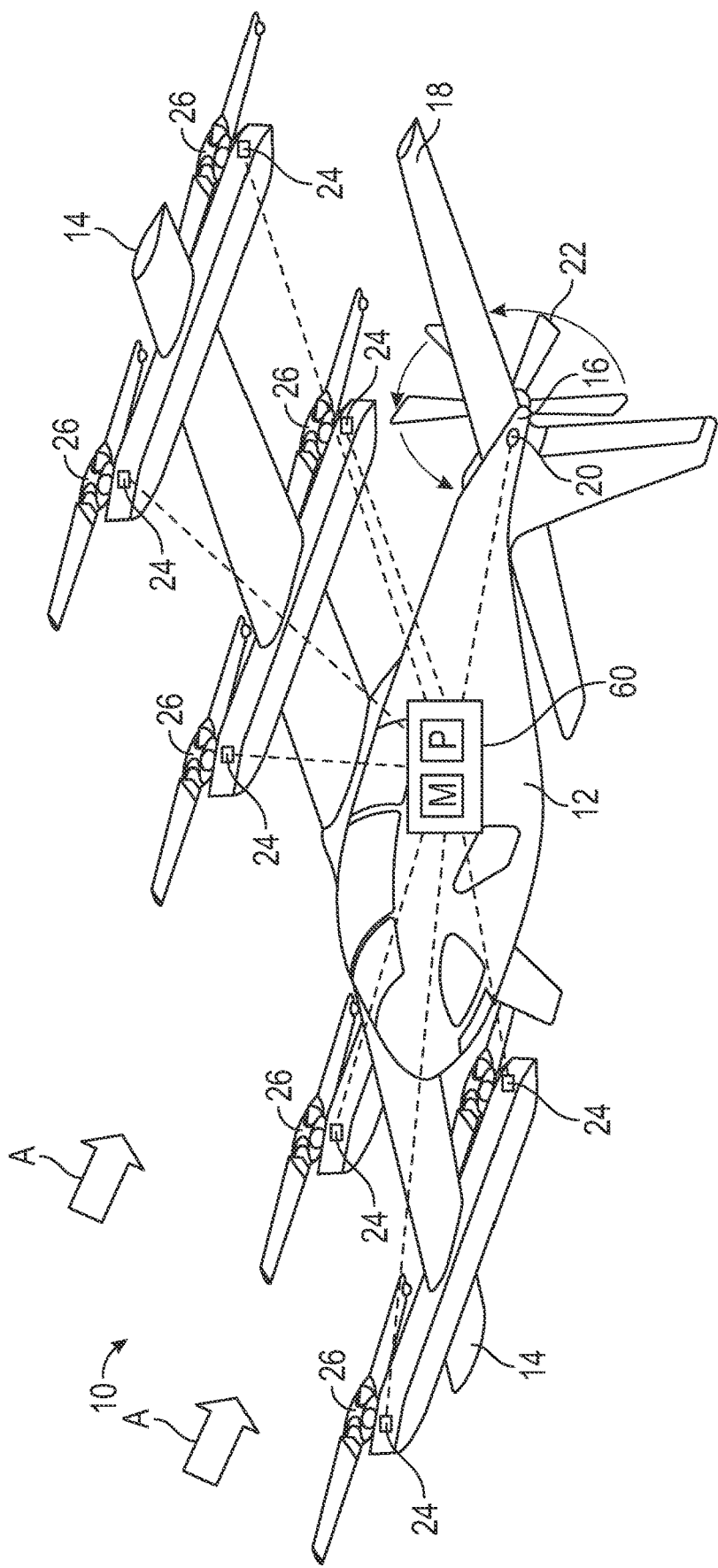
FIG. 2 is a schematic illustration of the aircraft of FIG. 1 in a cruise phase, with the propellers stationary and aligned in a predetermined orientation relative to the wings when the cruise phrase.

Referring to the figures, wherein like numerals indicate like or corresponding parts throughout the several views, an aircraft 10 is generally shown in FIGS. 1 and 2.

The aircraft 10 may be a manned aircraft 10 that is flown by one or more pilots therein, or may be an unmanned aircraft 10 that is flown without a pilot therein (e.g., a drone). The structure of aircraft 10 as shown in FIGS. 1 and 2 is one non-limiting example, and it is to be appreciated that the aircraft 10 may be configured differently than shown and still utilize the features described herein. In the example of FIGS. 1 and 2, the aircraft 10 may include a fuselage 12 and a plurality of wings 14 extending from opposite sides of fuselage 12, which assist in horizontal or wing-borne flight. The aircraft 10 may include a tail 16 having one or more tail-wings 18 that extend from the fuselage 12 and/or the tail 16.

Continuing with FIGS. 1 and 2, the aircraft 10 may also include a main propulsor 20 that rotates a main propeller 22 to provide thrust for wing-borne flight. The main propeller 22 may be in any suitable location, and in the example of FIGS. 1 and 2 the main propeller 22 is coupled to the tail 16. It is to be appreciated that the main propulsor 20 may be any suitable type of propulsor to operate the main propeller 22 and/or to generate thrust, such as jet engines, electric machines, electric motors, etc. In addition, more than one main propulsor 20 may be used and/or more than one main propeller 22 may be used.

Again, continuing with FIGS. 1 and 2, the aircraft 10 may further include a plurality of auxiliary propulsors 24 and a plurality of auxiliary propellers 26 coupled to the respective auxiliary propulsors 24. That is, one of the auxiliary propellers 26 is operated by one of the auxiliary propulsors 24, and so on depending on the number of auxiliary propellers 26 being utilized. Therefore, operation of the auxiliary propulsors 24 rotates the respective auxiliary propellers 26 to provide thrust for take-off and landing. The auxiliary propellers 26 may be in any suitable location, and in the example of FIGS. 1 and 2, some of the auxiliary propellers 26 are coupled to one of the wings 14 and other ones of the auxiliary propellers 26 are coupled to the other one of the wings 14. It is to be appreciated that the auxiliary propulsors 24 may be any suitable type of propulsor to operate the auxiliary propellers 26, such as jet engines, electric machines, electric motors, etc. In addition, any suitable number of auxiliary propulsors 24 and the auxiliary propellers 26 may be used.

Generally, the aircraft 10 may take-off from a location, cruise, and land at a desired location. For example, the aircraft 10 may be a vertical take-off and landing (VTOL) type of vehicle, and in certain configurations, the VTOL type of the aircraft 10 is an electric vehicle, i.e., includes electric powered motor and/or electrical batteries. It is to be appreciated that the VTOL type of the aircraft 10 may be a fuel powered vehicle or any other suitable powered VTOL vehicle. In the configuration of the VTOL type of vehicle, the aircraft 10 may land and take-off vertically without relying on a runway, and the VTOL type of vehicle may hover vertically.

The aircraft 10 may move vertically relative to the ground when taking-off and landing, which will be referred to as a hover phase. Referring to FIG. 1, which is an illustration of the hover phase, the main propeller 22 may be stationary when the aircraft 10 is in the hover phase, and the auxiliary propellers 26 operate to provide thrust for take-off and landing when the aircraft 10 is in the hover phase. That is, the auxiliary propellers 26 are operated to take-off and land the aircraft 10 and the main propeller 22 is not operated in this phase, i.e., in the hover phase.

The aircraft 10 may move horizontally when the aircraft 10 is cruising or in wing-born flight, which will be referred to as a cruise phase. Generally, the cruise phase occurs after the hover phase when the aircraft 10 has taken off. It is to be appreciated that when the aircraft 10 is going to land after the cruise phase, the aircraft 10 will return to the hover phase and operate as discussed above.

Referring to FIG. 2, which is an illustration of the cruise phase, the main propulsor 20 operates to provide thrust to rotate the main propeller 22 for wing-borne flight when the aircraft 10 is in the cruise phase, and the auxiliary propellers 26 are not operated in this phase, i.e., in the cruise phase. That is, the main propeller 22 is operated to cruise the aircraft 10 and the auxiliary propellers 26 are off in this phase, i.e., the cruise phase. The present disclosure provides a way to lock the auxiliary propellers 26 in a stationary position when the aircraft 10 is in the cruise phase, which reduces drag because the auxiliary propellers 26 will not be able to free-wheel.

The aircraft 10 may take-off and land on a runway, a landing pad, or any suitable ground. Therefore, the aircraft 10 may include a landing gear assembly indirectly or directly coupled to the fuselage 12. Optionally, the landing gear assembly may be movable relative to the fuselage 12 between a retracted position and an extended position. During landing and take-off, the landing gear assembly is in the extended position to facilitate movement of the aircraft 10 on the ground and/or prevent the fuselage 12 from directly contacting the ground. When the aircraft 10 is in the air, if the landing gear is retractable, the landing gear assembly may move to the retracted position to minimize drag.

The aircraft 10 may be electrically powered and/or fuel powered, or powered by any other suitable fuels, components, energy storage devices, optionally including batteries, etc. Therefore, the main propulsor 20 and the auxiliary propulsors 24 of the aircraft 10 may be electrically powered and/or fuel powered, or powered by any other suitable fuels, components, energy storage devices, optionally including batteries, etc.

As non-limiting examples, the auxiliary propulsors 24 may be an electric machine 24, such as a rotating or rotary-type electric machine 24, referred to hereinafter as the electric machine 24 for simplicity. The below discussion applies to any number of auxiliary propulsors 24, and thus, any number of the electric machines. The below discussion generally refers to one electric machine 24, but it is to be appreciated that each of the electric machines 24 may include the features discussed below.

Figure 3:
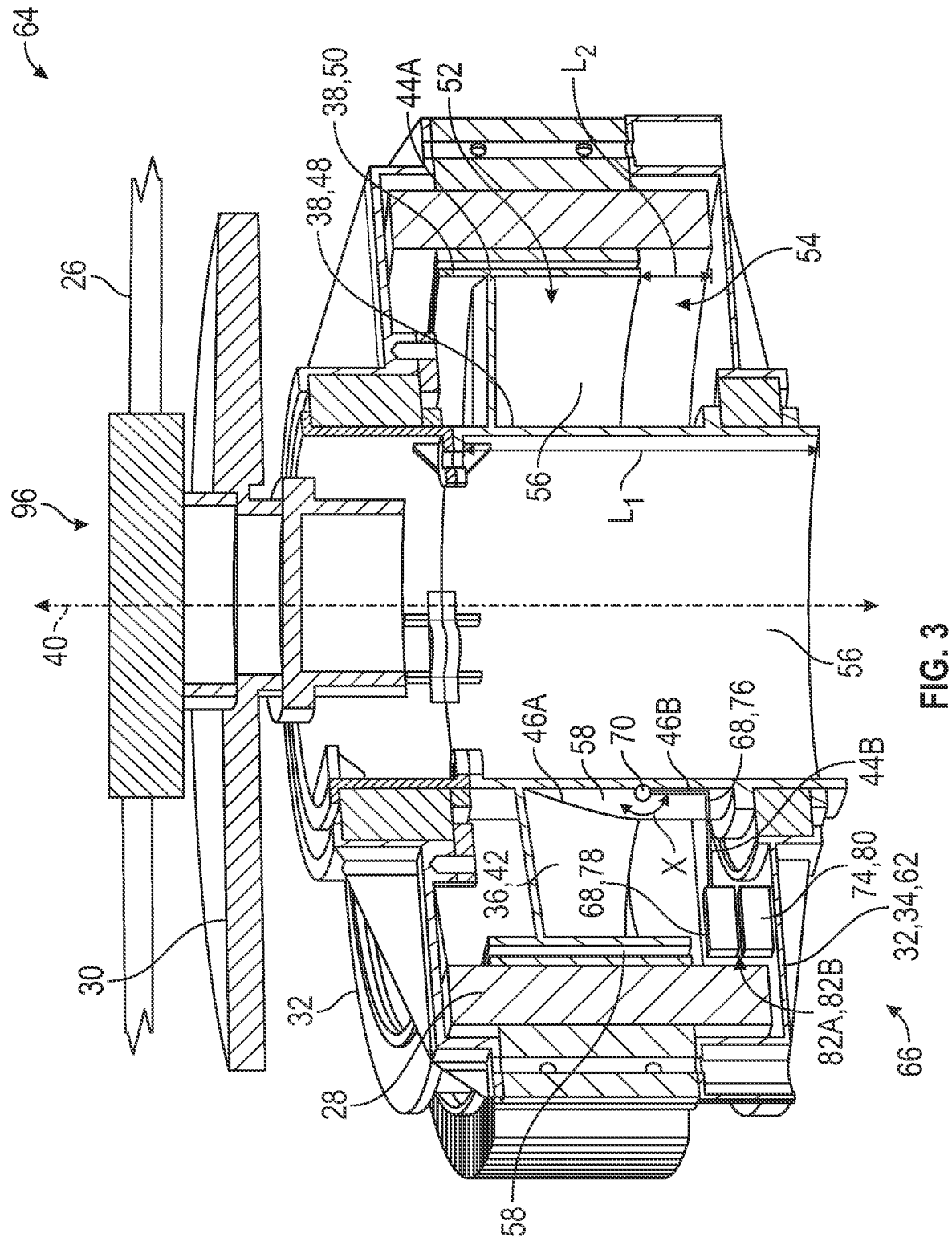
FIG. 3 is a schematic illustration of a propulsor attached to a propeller, with a locking assembly disposed in a first configuration.
Figure 4:
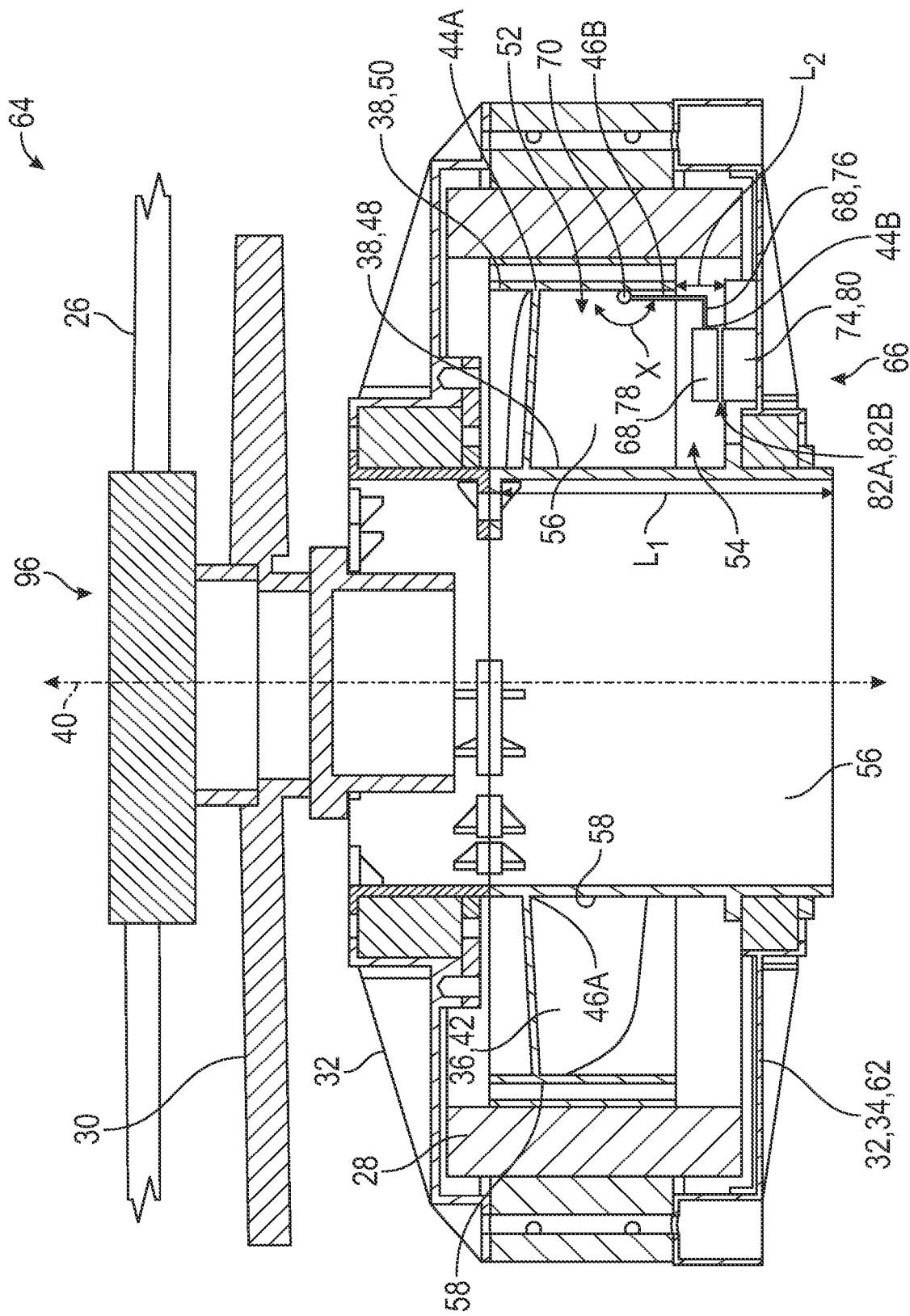
FIG. 4 is a schematic illustration of a propulsor attached to a propeller, with a locking assembly disposed in a second configuration.

Referring to FIGS. 3 and 4, the electric machine 24 may include a stator 28 and a rotor 30 that is rotatable relative to the stator 28 when the electric machine 24 is operating. The stator 28 may include windings, or electromagnets that each includes a coiled conductor, that is configured to generate a magnetic field when electric current is passed through the windings or the coiled conductor The magnetic field causes the rotor 30 to rotate during operation of the electric machine 24. Therefore, each of the electric machines 24 include a stator 28 and a rotor 30. The auxiliary propeller 26, the stator 28, and the rotor 30 are illustrated in FIGS. 3 and 4, but these features are also applicable FIGS. 5-8.

Referring to FIGS. 3 and 4, the electric machine 24 may include a housing 32 having an end cap 34. Generally, the housing 32 of the electric machine 24 is fixed to a component of the aircraft 10 such that the housing 32 remains in a fixed position. That is, the housing 32 is stationary. Therefore, the end cap 34 is also stationary. In addition, the stator 28 is disposed inside of the housing 32, and optionally, one or more portions of the rotor 30 may be disposed inside of the housing 32. Each of the electric machines 24 may include the housing 32 and the end cap 34.

Again, referring to FIGS. 3 and 4, the electric machine 24 may include a fan blade structure 36 configured to dissipate heat inside of the electric machine 24. In addition, the electric machine 24 includes a first wall 38 rotatable about a longitudinal axis 40. Generally, the first wall 38 is attached to the fan blade structure 36. Therefore, the first wall 38 and the fan blade structure 36 are rotatable concurrently with each other. The fan blade structure 36 may include any suitable number of blades 42, and the blades 42 may be spaced from each other. Furthermore, generally, the fan blade structure 36 and the first wall 38 are disposed inside of the housing 32 of the electric machine 24.

In addition, generally, the first wall 38 surrounds the fan blade structure 36. For example, the first wall 38 may surround the fan blade structure 36 relative to a distal end 44A of the fan blade structure 36. As another example, the first wall 38 may surround the fan blade structure 36 relative to a proximal end 46A of the fan blade structure 36. As yet another example, the first wall 38 may include an inner wall portion 48 and an outer wall portion 50 spaced apart from each other to define an opening 52 therebetween. The fan blade structure 36 is disposed between the inner wall portion 48 and the outer wall portion 50, and specifically, the fan blade structure 36 is disposed in the opening 52. More specifically, the blades 42 of the fan structure are disposed in the opening 52.

In certain configurations, the first wall 38 may surround both the distal end 44A and the proximal end 46A of the fan blade structure 36. For example, the distal end 44A of the fan blade structure 36 is attached to the outer wall portion 50, and the proximal end 46A of the fan blade structure 36 is attached to the inner wall portion 48. Therefore, in this configuration, the inner wall portion 48, the outer wall portion 50, and the fan blade structure 36 are rotatable concurrently with each other about the longitudinal axis 40. Also, it is to be appreciated that the inner wall portion 48, the outer wall portion 50, and the blades 42 may be attached to each other or formed as one unitary unit, and thus, be referred to as the fan blade structure 36.

Continuing with FIGS. 3 and 4, the inner wall portion 48 and the outer wall portion 50 of the first wall 38 are spaced away from the longitudinal axis 40. More specifically, the inner wall portion 48 and the outer wall portion 50 each surround the longitudinal axis 40 such that the longitudinal axis 40 is disposed inside of the inner wall portion 48 and the outer wall portion 50. The inner wall portion 48 is disposed closer to the longitudinal axis 40 than the outer wall portion 50 is to the longitudinal axis 40. That is, for example, the inner wall portion 48 is disposed radially closer to the longitudinal axis 40 than the outer wall portion 50 is to the longitudinal axis 40, such that the inner wall portion 48 is disposed inside of the outer wall portion 50.

Furthermore, the inner wall portion 48 may have a first length $L_1$ that is substantially parallel to the longitudinal axis 40, and the outer wall portion 50 may have a second length $L_2$ that is substantially parallel to the longitudinal axis 40. In certain configurations, the first length $L_1$ is greater than the second length $L_2$. Therefore, the outer wall portion 50 provides a space 54 between the housing 32 and the outer wall portion 50 that is substantially parallel to the longitudinal axis 40.

Continuing with FIGS. 3 and 4, the first wall 38 may include an inner surface 56 that faces inwardly toward the longitudinal axis 40 and an outer surface 58 that opposes the inner surface 56 and faces outwardly away from the longitudinal axis 40. Each of the inner wall portion 48 and the outer wall portion 50 includes a respective inner surface 56 and a respective outer surface 58 of the first wall 38. Therefore, the inner surface 56 of the first wall 38 of the inner wall portion 48 is disposed closer to the longitudinal axis 40 than the inner surface 56 of the first wall 38 of the outer wall portion 50 relative to the longitudinal axis 40. Similarly, the outer surface 58 of the first wall 38 of the inner wall portion 48 is disposed closer to the longitudinal axis 40 than the outer surface 58 of the first wall 38 of the outer wall portion 50 relative to the longitudinal axis 40. In certain configurations, the blades 42 of the fan blade structure 36 is attached to the outer surface 58 of the inner wall portion 48 and attached to the inner surface 56 of the outer wall portion 50.

Continuing with FIGS. 3 and 4, one of the auxiliary propellers 26 is attached to the rotor 30 of one of the electric machines 24, and the rotor 30 of that electric machine 24 is attached to the fan blade structure 36 via the first wall 38. Therefore, one rotor 30 is attached to one auxiliary propeller 26, and so on depending on the number of auxiliary propellers 26 being used. When the electric machine 24 is energized to rotate the rotor 30, the rotor 30 causes one of the auxiliary propellers 26 to correspondingly rotate. More specifically, when the rotor 30 rotates due to being energized, the rotor 30, the auxiliary propeller 26, the fan blade structure 36, and the first wall 38 concurrently rotate. For the discussion below, the rotor 30 may be referred to as a propeller rotor 30.

The electric machine 24 may be controlled via a controller 60. That is, the controller 60 signals the electric machine 24 to operate or to turn-off depending on the desired operation. Specifically, the controller 60 signals the electric machine 24 to switch between modes. For example, the electric machine 24 may have a first mode to energize the electric machine 24 to produce torque, and a second mode to deenergize the electric machine 24 to stop production of the torque. Generally, the electric machine 24 is coupled to the propeller rotor 30 and the first mode energizes the electric machine 24 to produce torque to drive rotation of the propeller rotor 30, and the second mode deenergizes the electric machine 24 to stop production of the torque which causes rotation of the propeller rotor 30 to stop. Simply stated, in the first mode, the propeller rotor 30 rotates which causes rotation of the auxiliary propeller 26, and in the second mode, the propeller rotor 30 slows down to a stop which causes the auxiliary propeller 26 to slow down to a stop. While the electric machine 24 is in the first mode, the torque produced via the electric machine 24 may be varied to increase thrust or decrease thrust depending on the desired operation of the aircraft 10.

Therefore, the controller 60 may be in electrical communication with one or more of the electric machines 24. Optionally, a plurality of controllers 60 may be used, with one controller 60 in electrical communication with a respective one of the electric machines 24. In addition, optionally, each of the controller 60 may communicate with each other and/or to a main controller 60. Instructions may be stored in a memory M of the controller 60 and automatically executed via a processor P of the controller 60 to provide the respective control functionality.

The controller 60 is configured to execute the instructions from the memory, via the processor. For example, the controller 60 may be a host machine or distributed system, e.g., a computer such as a digital computer or microcomputer, and, as the memory M, tangible, non-transitory computer-readable memory such as read-only memory (ROM) or flash memory. The controller 60 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 60 may include all software, hardware, memory M, algorithms, connections, sensors, etc., necessary to control, for example, the electric machines 24. As such, a control method operative to control the electric machines 24 may be embodied as software or firmware associated with the controller 60. It is to be appreciated that the controller 60 may also include any device capable of analyzing data from various sensors, comparing data, making the necessary decisions required to control and/or monitor the electric machines 24.

Referring to FIGS. 3 and 4, the electric machine 24 includes a second wall 62 spaced apart from the first wall 38. The second wall 62 is stationary relative to the first wall 38 regardless of the electric machine 24 being in the first mode or the second mode. In certain configurations, the second wall 62 is a stationary component of the electric machine 24. Therefore, in certain configurations, the second wall 62 may be further defined as part of the housing 32 of the electric machine 24, the end cap 34 of the housing 32 of the electric machine 24, or a component of the stator 28, etc. The second wall 62 will be discussed further below.

It is desirable to prevent rotation of the auxiliary propellers 26 when the aircraft 10 is in the cruise phase, which will assist in reducing or minimizing drag. Therefore, as will be discussed in detail below, FIGS. 3-8 illustrate features of a locking assembly 64 that may be used to lock the auxiliary propeller 26 in a desired position when the aircraft 10 is in the cruise phase to reduce or minimize drag. Specifically, the locking assembly 64 may be used to lock the propeller rotor 30 in a desired position, which correspondingly locks the auxiliary propeller 26 coupled to that propeller rotor 30 in the desired position. Therefore, the locking assembly 64 prevents the propeller rotor 30 and the corresponding auxiliary propeller 26 from free-wheeling when the aircraft 10 is cruising in wing-borne flight. It is to be appreciated that the locking assembly 64 may be used on any desired number of propeller rotors 30/auxiliary propellers 26, and therefore, a plurality of locking assemblies 64 may be utilized depending on the number of propeller rotors 30/auxiliary propellers 26 being utilized. As such, the features of the locking assembly 64 may be incorporated into any desired number of auxiliary propulsors 24, even though the below discussion focuses on one auxiliary propulsor 24/electric machine 24.

Turning to FIGS. 3-8, the locking assembly 64 also includes a magnetic assembly 66 that is configured to prevent rotation of the auxiliary propeller 26 when the aircraft 10 is in the cruise phase. The arrangement of the magnetic assembly 66 with the electric machine 24 provides a way to lock the auxiliary propeller 26 in a desired position, via the propeller rotor 30, when the aircraft 10 is in the cruise phase. Therefore, the locking assembly 64 may include the electric machine 24, and thus, includes the first wall 38 of the electric machine 24 being rotatable about the longitudinal axis 40 when the electric machine 24 is in the first mode. The first wall 38 of the electric machine 24 is coupled to the propeller rotor 30 such that the first wall 38 and the propeller rotor 30 are rotatable together about the longitudinal axis 40 when the electric machine 24 is in the first mode.

The first wall 38 becomes stationary relative to the longitudinal axis 40 when the electric machine 24 is in the second mode. That is, the first wall 38 and the propeller rotor 30 become stationary relative to the longitudinal axis 40 when the electric machine 24 is in the second mode. The arrangement of the magnetic assembly 66 with the electric machine 24 allows the auxiliary propeller 26 to be locked in the desired position.

Generally, it is desirable to lock the auxiliary propellers 26 in a complementary orientation relative to the direction of the airflow as the aircraft 10 is cruising to minimize drag. For example, as shown in FIG. 2, the auxiliary propellers 26 may be locked in a fore-aft position. When the aircraft 10 is in the cruise phase, generally moving forward, an airflow A is directed into the aircraft 10 and across the wings 14 as represented by arrows A in FIG. 2. Therefore, it is desirable to orientate the auxiliary propeller 26 into the airflow A, such as shown in FIG. 2, in the fore-aft position. That is, the auxiliary propeller 26 is orientated generally lateral relative to the airflow A, generally in the same direction as the airflow A, or in some configurations substantially parallel to the airflow A.

As mentioned above, the magnetic assembly 66 is configured to prevent rotation of the auxiliary propeller 26 when the aircraft 10 is in the cruise phase. Therefore, each of the auxiliary propellers 26 may be equipped with the magnetic assembly 66. The magnetic assembly 66 uses magnetic attraction to lock the auxiliary propeller 26 in the fore-aft position, and the details are discussed below. That is, the magnetic assembly 66 is designed to create a magnetic interaction that locks the auxiliary propeller 26 in the fore-aft position.

Turning to FIGS. 3-8, the magnetic assembly 66 includes a first component 68 coupled to the first wall 38 via a pivot point 70. Therefore, the first component 68 is supported by the first wall 38. As discussed above, the first wall 38 is attached to the propeller rotor 30, and therefore, movement of the propeller rotor 30 causes movement of the first wall 38. The first component 68 is also movable in response to movement of the propeller rotor 30. That is, the first component 68 is rotatable about the longitudinal axis 40 concurrently with the propeller rotor 30. It is to be appreciated that the first component 68 may be in any suitable location along the first wall 38, and the figures provide some non-limiting examples.

In addition, the first component 68 is movable relative to the pivot point 70 to a locked position and an unlocked position. Therefore, the pivot point 70 may define a pivot axis 72. It is to be appreciated that directional arrows X in FIGS. 3-8 are illustrative of the general movement of the first component 68 about the pivot axis 72 between the locked position and the unlocked position. The movement of the first component 68 relative to the pivot point 70 (i.e., pivot axis 72) is independent of the rotation of the first component 68 relative to the longitudinal axis 40. Therefore, the first component 68 is movable relative to multiple axes 40, 72, but the first wall 38 is rotatable relative to the longitudinal axis 40, not the pivot axis 72.

As the speed of the propeller rotor 30 increases about the longitudinal axis 40, the first component 68 rotates at the same speed with the propeller rotor 30 about the longitudinal axis 40, and the forces acting on the first component 68 due to this rotation, causes the first component 68 to also rotate independently of the first wall 38 relative to the pivot axis 72 to the unlocked position. As the speed of the propeller rotor 30 decreases about the longitudinal axis 40, the first component 68 again rotates at the same speed as the propeller rotor 30 about the longitudinal axis 40, and the forces acting on the first component 68 due to this rotation causes the first component 68 to also rotate independently of the first wall 38 relative to the pivot axis 72 to the locked position.

For the locked position to be achieved, a first speed threshold is reached, and for the unlocked position to be achieved, a second speed threshold is reached. The first speed threshold and the second speed threshold may be any suitable speed value based on engineering requirements, government requirements, aircraft parameters, etc. As one non-limiting example, the first speed threshold may be greater than 100 revolutions per minute (rpm). As another non-limiting example, the first speed threshold may be greater than 200 rpm. As yet another non-limiting example, the second speed threshold may be 100 rpm or less. As another non-limiting example, the second speed threshold may be 200 rpm or less.

Continuing with FIGS. 3-8, the magnetic assembly 66 also includes a second component 74 attached to the second wall 62. As discussed above, the second wall 62 is stationary. Therefore, the second component 74 is also stationary. The first component 68 and the second component 74 interact with each other to create the magnetic attraction when the first component 68 is in the locked position.

Referring to FIGS. 3-6 and 8, the first component 68 and the second component 74 align proximal to each other when the first component 68 is in the locked position such that the first component 68 and the second component 74 create the magnetic attraction therebetween to lock the first wall 38 in a stationary position when the electric machine 24 is in the second mode. More specifically, the first component 68 and the second component 74 align proximal to each other when the first component 68 is in the locked position such that the first component 68 and the second component 74 create the magnetic attraction therebetween to lock the first wall 38 and the propeller rotor 30 in the stationary position when the electric machine 24 is in the second mode. That is, magnetic latching occurs between the first component 68 and the second component 74, without there being a physical attachment or physical engagement between the first component 68 and the second component 74.

Figure 7:
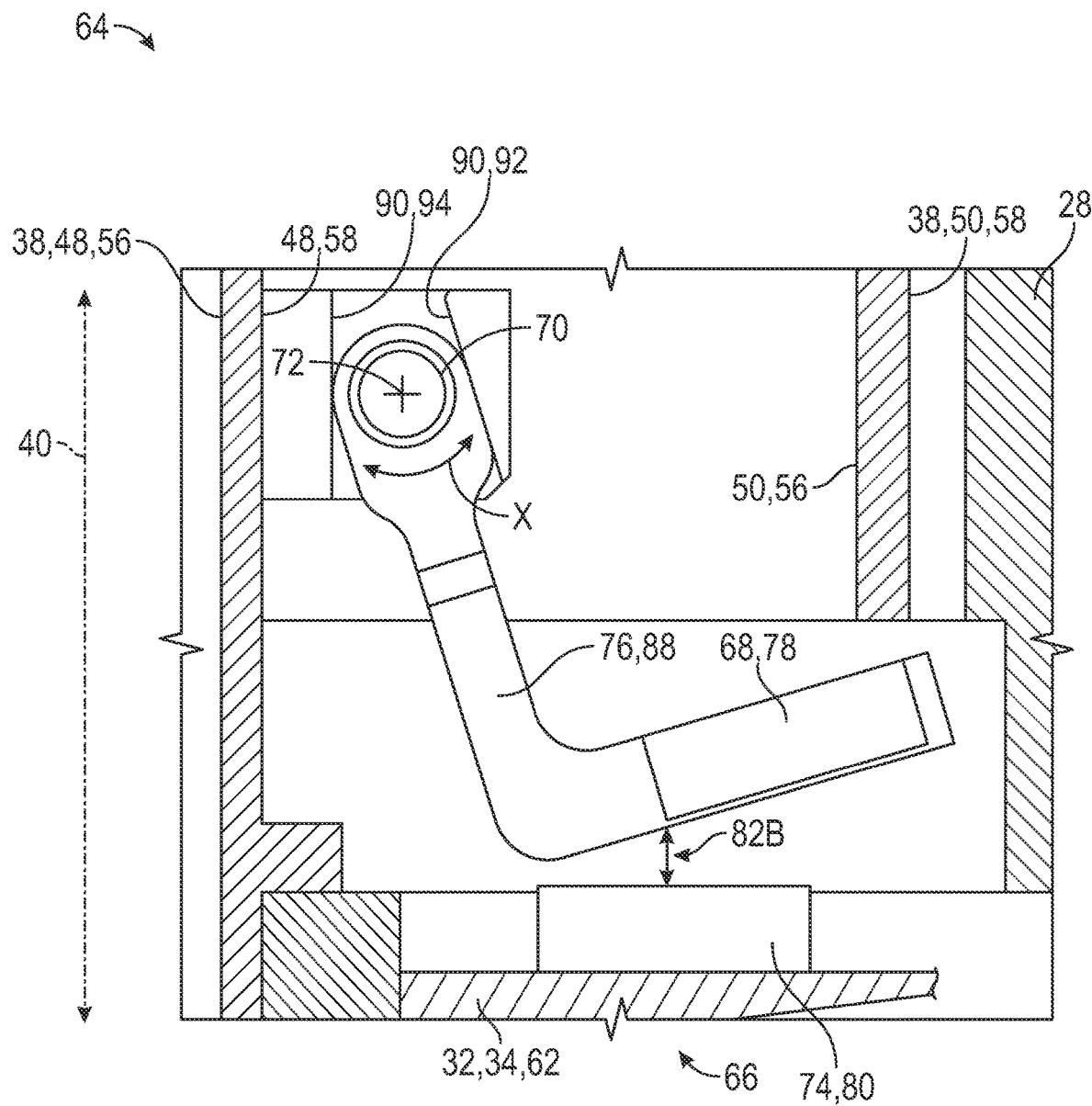
FIG. 7 is a schematic illustration of the magnetic assembly of FIG. 6 in an unlocked position.

Referring to FIG. 7, the first component 68 moves away from the second component 74 to the unlocked position due to rotation of the first wall 38 when the electric machine 24 is in the first mode. In certain configurations, the second component 74 is a stationary component of the electric machine 24. Therefore, in certain configurations, the second component 74 may be further defined as part of the housing 32 of the electric machine 24, the end cap 34 of the housing 32 of the electric machine 24, or a component of the stator 28, etc.

Referring to FIGS. 3-8, the first component 68 may include an arm 76 having a proximal end 46B attached to the first wall 38 via the pivot point 70 and a distal end 44B extending outwardly away from the proximal end 46B such that the distal end 44B is spaced apart from the first wall 38.

The orientation and the configuration of the arm 76 may be any suitable orientation/configuration, and the figures provide some non-limiting examples. The different orientations and configurations will be discussed further below.

Generally, the first component 68 may include at least one first magnet 78, and the second component 74 may include at least one second magnet 80 (see FIGS. 3-8). The at least one first magnet 78 is attached to the distal end 44B of the arm 76. The at least one second magnet 80 is attached to the second wall 62. In certain configurations, the first magnet 78 aligns proximal to the second component 74 to create the magnetic attraction therebetween to lock the first wall 38 in the stationary position when the first component 68 is in the locked position. In other configurations, the first component 68 aligns proximal to the second magnet 80 to create the magnetic attraction therebetween to lock the first wall 38 in the stationary position when the first component 68 is in the locked position. More specifically, the first magnet 78 aligns proximal to the second magnet 80 to create the magnetic attraction therebetween to lock the first wall 38 in the stationary position when the first component 68 is in the locked position. The magnetic attraction created, when the first component 68 is in the locked position, is designed to be stronger than the forces due to the airflow A across the auxiliary propeller 26 to maintain the propeller rotor 30 in the stationary position.

Referring to FIGS. 3-8, the first magnet 78 and the second magnet 80 are spaced away from each other regardless of the position of the first magnet 78 relative to the second magnet 80, with the difference being the size of a gap 82A, 82B between the first magnet 78 and the second magnet 80. Therefore, depending on the size of the gap 82A, 82B, the magnetic attraction changes, and thus, the magnetic assembly 66 uses magnetic latching to lock the propeller rotor 30 in the stationary position. No contact occurs between the first magnet 78 and the second magnet 80. That is, locking of the propeller rotor 30 relative to the housing 32 of the electric machine 24 is not by a physical attachment between the propeller rotor 30 and the housing 32, and instead occurs via the magnetic latching. As such, no drag is created between the first magnet 78 and the second magnet 80 due to the gap 82A, 82B being present at all times.

Turning to FIGS. 3-6 and 8, the first magnet 78 and the second magnet 80 define a first gap 82A therebetween when the first component 68 is in the locked position. Referring to FIG. 7, the first magnet 78 and the second magnet 80 define a second gap 82B therebetween when the first component 68 is in the unlocked position. As best shown by comparing FIGS. 3-8, the second gap 82B of FIG. 7 is greater than the first gap 82A of FIGS. 3-6 and 8.

Figure 9:
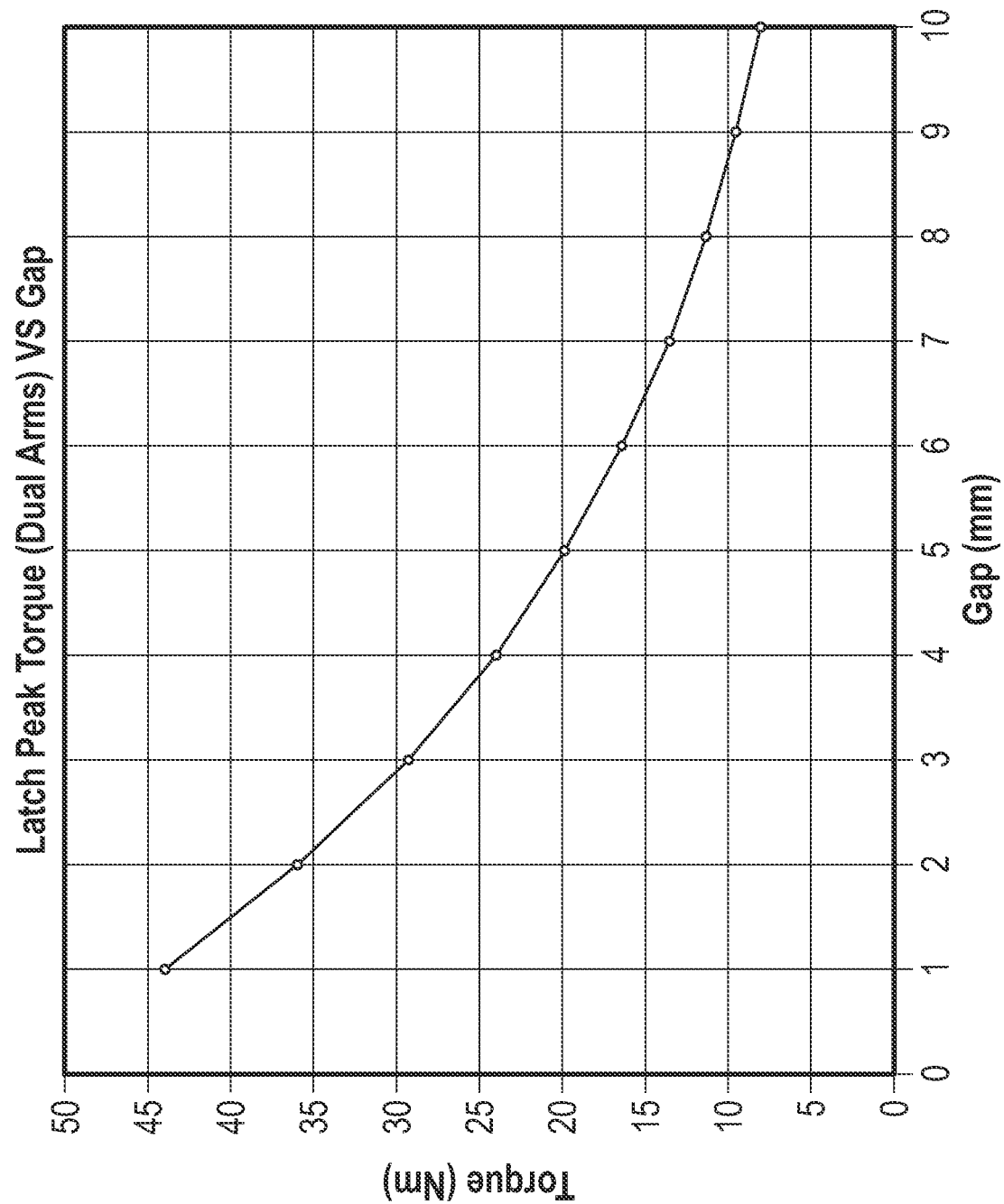
FIG. 9 is a graph of a torque amount verses a size of a gap for a peak locking torque.

When a predetermined torque is reached from operation of the electric machine 24, the torque will override the magnetic attraction or magnetic pull between the first magnet 78 and the second magnet 80 and the first magnet 78 will move to the unlocked position. Referring to FIG. 9, one non-limiting example of the relationship between the torque to lock the propeller rotor 30 in the locked position (i.e., locking torque) versus the size of the gap 82A, 82B is provided, and if these parameters are met (i.e., peak torque vs size of the gap 82A, 82B), the magnet attraction between the first magnet 78 and the second magnet 80 will be overcome to unlock the propeller rotor 30. The relationship as illustrated in the FIG. 9 relates to a dual arm magnetic array, which corresponds to the array of FIG. 11.

Operation of the electric machine 24 in the first mode may easily override the second mode because the torque that locks the propeller rotor 30 in the locked position is overcome. For example, when the electric machine 24 is operating in the first mode to produce a torque of about 50 Newton meter (Nm) or greater, the magnetic attraction between the first magnet 78 and the second magnet 80 may be overcome to move to the unlocked position. That is, the locking torque is overcome to move the first component 68 to the unlocked position. Therefore, for example, the torque (i.e., the locking torque) to lock the first magnet 78 and the second magnet 80 in the locked position may be about 50 Nm or less. As another example, the torque produced in the first mode may be increased to about 400 Nm or greater, which is greater than the torque to lock the propeller rotor 30 in the locked position, and therefore, the magnetic attraction is overcome.

When the first component 68 (with the first magnet 78) moves away from the second component 74 (with the second magnet 80) toward the unlocked position, the gap 82A, 82B therebetween increases, which causes the magnetic attraction between the first magnet 78 and the second magnet 80 to decrease, eventually to a negligible amount. Therefore, when the propeller rotor 30 is rotating in normal operation (such as about 400 rpm or greater), the propeller rotor 30 is in the unlocked position and the gap 82A, 82B moves to the second gap 82B spacing, which reduces the magnetic attraction between the first magnet 78 and the second magnet 80 to the negligible amount. Thus, the operation of the propeller rotor 30 is not affected by the magnetic assembly 66.

In certain configurations, a plurality of magnets 78, 80 may be utilized. FIGS. 10-13 include various non-limiting examples, which will be discussed further below. For illustrative purposes, many structures have been eliminated in FIGS. 10-13 to focus on the magnet configurations relative to the longitudinal axis 40.

For example, the at least one first magnet 78 of the first component 68 may include a plurality of first magnets 78, and the at least one second magnet 80 of the second component 74 may include a plurality of second magnets 80. In certain configurations, the at least one first magnet 78 of the first component 68 may include the plurality of first magnets 78 spaced apart from each other around the first wall 38, and the at least one second magnet 80 of the second component 74 may include the plurality of second magnets 80 spaced apart from each other around the second wall 62. The first magnets 78 may be spaced around the first wall 38 radially relative to the longitudinal axis 40, and the second magnets 80 may be spaced around the second wall 62 radially relative to the longitudinal axis 40.

In certain configurations, respective first magnets 78 and respective second magnets 80 define the first gap 82A therebetween when the first component 68 is in the locked position, as similarly discussed above in reference to the first magnet 78 and the second magnet 80. Furthermore, the respective first magnets 78 and the respective second magnets 80 define the second gap 82B therebetween when the first component 68 is in the unlocked position, as similarly discussed above in reference to the first magnet 78 and the second magnet 80. The second gap 82B of the respective first magnets 78 and the respective second magnets 80 is greater than the first gap 82A of the respective first magnets 78 and the respective second magnets 80, as similarly discussed above in reference to the first magnet 78 and the second magnet 80.

Generally, the first magnets 78 and the second magnets 80 are arranged relative to each other to create the magnetic attraction when the electric machine 24 is in the second mode. The above discussion with regards to the first magnet 78 and the second magnet 80 also applies to the first magnets 78 and the second magnets 80, and will not be repeated. In certain configurations, the first magnets 78 and the second magnets 80 are permanent magnets, and any of the configurations discussed herein may utilize permanent magnets as the magnets 78, 80.

In various configurations, the first magnets 78 and the second magnets 80 are arranged in a Halbach array, and more specifically, the first magnets 78 and the second magnets 80 may be collectively arranged in the Halbach array. The Halbach array is an arrangement of permanent magnets that create a magnetic field on one side of the array but minimizes a magnetic field on the other side of the array. Therefore, having the magnetic assembly 66 described herein optionally utilizing the Halbach array, the magnetic field created between the first magnets 78 and the second magnets 80 may be focused to a desired location between these magnets 78, 80 and minimize any stray magnetic field being produced to affect the locking torque.

Optionally, the plurality of first magnets 78 may be arranged in clusters 84, 86 and the plurality of second magnets 80 may be arranged in clusters 84, 86 (see for example FIGS. 10-13). Specifically, the first magnets 78 are clustered together and the second magnets 80 are also clustered together, and respective clusters 84, 86 cooperate with each other to create the locking torque when in the locked position. Generally, the first magnets 78 are separated into a plurality of first clusters 84 each having two or more of the first magnets 78. Each of the first clusters 84 are spaced from each other around the first wall 38.

Similarly, the second magnets 80 are separated into a plurality of second clusters 86 each having two or more of the second magnets 80. Each of the second clusters 86 are spaced from each other around the second wall 62. The first clusters 84 and the second clusters 86 create a permanent magnet array, and in various configurations, the first clusters 84 and the second clusters 86 are arranged in the Halbach array.

Figure 10:
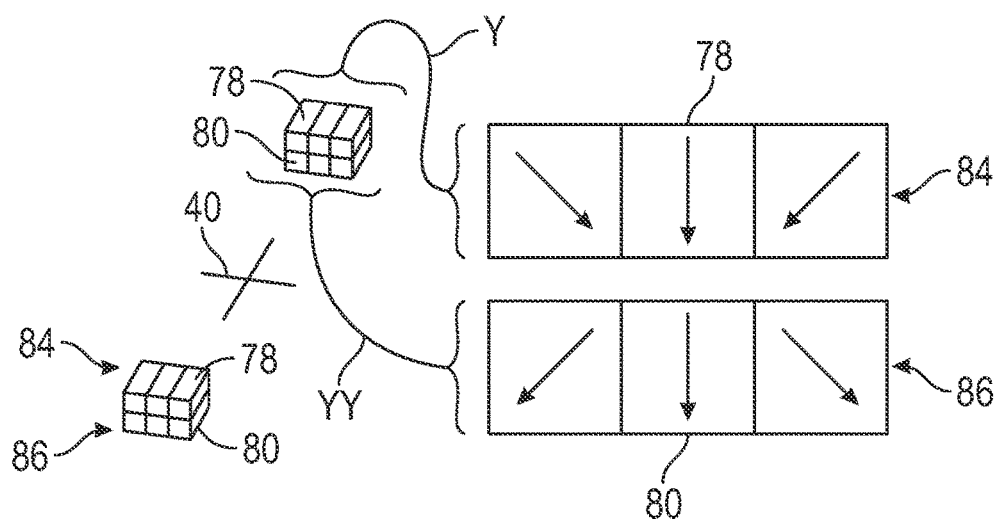
FIG. 10 is a schematic illustration of a permanent magnet array and the corresponding magnetization pattern.
Figure 11:
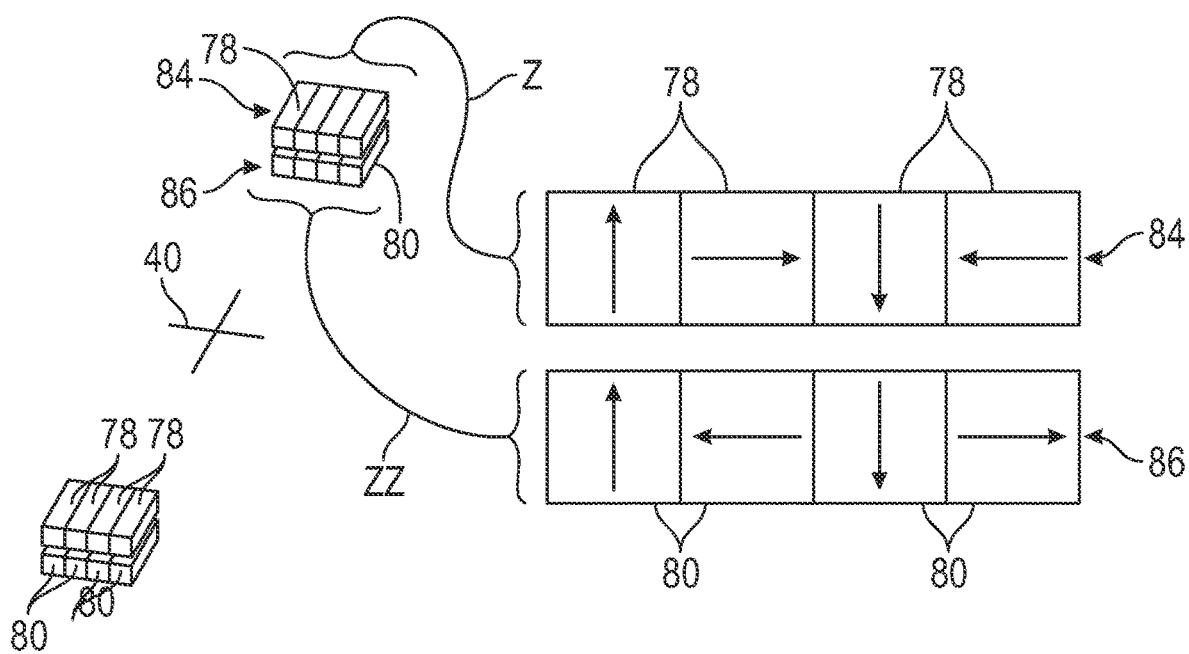
FIG. 11 is schematic illustration of another permanent magnet array and the corresponding magnetization pattern.

In the examples of FIGS. 10-13, the first clusters 84 and the second clusters 86 are illustrated relative to each other when in the locked position (i.e., the respective clusters 84, 86 align with each other). Also, provided in FIGS. 10 and 11, is the magnetization pattern for the permanent magnets. Different arrangements of the first cluster(s) 84 and the second cluster(s) 86 may provide different flux configurations, and examples will be discussed below. Generally, whether the flux is an axial flux configuration or a radial flux configuration depends on the flux direction in the gap 82A, 82B.

Referring to FIGS. 10 and 11, brackets have been provided to associate the magnetization pattern for each of the first magnets 78 of one of the first clusters 84, and similarly, brackets have been provided to associate the magnetization pattern for each of the second magnets 80 of one of the second clusters 86.

Referring to FIG. 10, as an example, there are two separate first clusters 84 and two separate second clusters 86, and one of the first clusters 84 has a bracket Y that correspond to the magnetization pattern of each of the first magnets 78. One of the second clusters 86 has a bracket YY that correspond to the respective magnetization pattern of each of the second magnets 80. Even though not labeled in FIG. 10, the other first cluster 84 and the other second cluster 86 have the same corresponding magnetization pattern as shown in FIG. 10. The configuration of FIG. 10 may create an axial flux configuration.

Now turning to FIG. 11, as another example, there are two separate first clusters 84 and two separate second clusters 86, and one of the first clusters 84 has a bracket Z that correspond to the magnetization pattern of each of the first magnets 78. One of the second clusters 86 has a bracket ZZ that correspond to the respective magnetization pattern of each of the second magnets 80. Even though not labeled in FIG. 11, the other first cluster 84 and the other second cluster 86 have the same corresponding magnetization pattern as shown in FIG. 11. The configuration of FIG. 11 may create an axial flux configuration.

The difference between the configuration of FIG. 10 and the configuration of FIG. 11 is that the number of magnets 78, 80 in the first cluster 84 is different than the number of magnets 78, 80 in the first cluster 84, and similarly, the number of magnets 78, 80 in the second cluster 86 is different than the number of magnets 78, 80 in the second cluster 86. In addition, the magnetization pattern of FIG. 11 is different from the magnetization pattern of FIG. 10.

Figure 12:
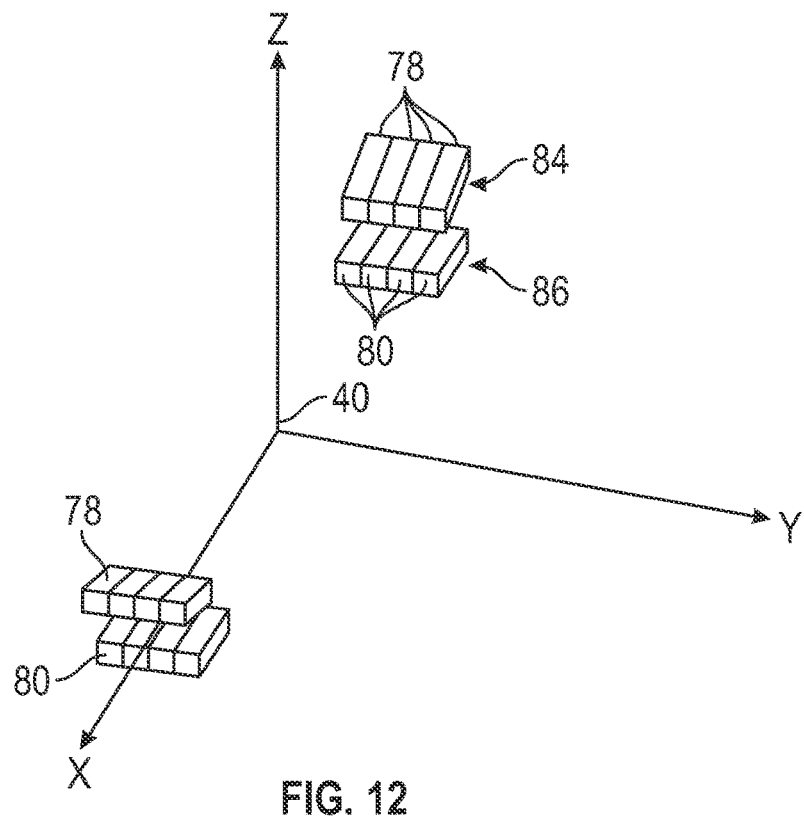
FIG. 12 is schematic illustration of yet another permanent magnet array.

FIG. 12 provides yet another example of two separate first clusters 84 and two separate second clusters 86, and the first clusters 84 are angled relative to the respective second clusters 86. The configuration of FIG. 12 may create an axial flux configuration.

Figure 13:
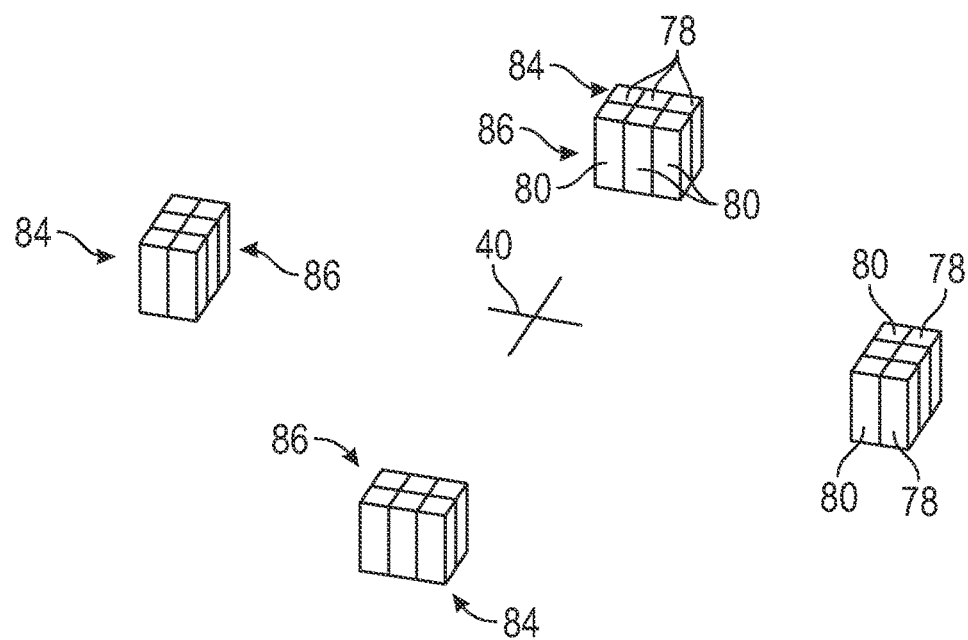
FIG. 13 is schematic illustration of another permanent magnet array.

Referring to FIG. 13, another example of the first clusters 84 and the second clusters 86 is provided. In this example, there are four separate first clusters 84 and four separate second clusters 86. The configuration of FIG. 13 may create a radial flux configuration.

It is to be appreciated that the orientation of the first clusters 84 and the second clusters 86 of the FIG. 10 configuration may be changed to the orientation of the FIG. 13 configuration, which would convert the FIG. 10 arrangement from the axial flux configuration to a radial flux configuration. Also, it is to be appreciated that the orientation of the first clusters 84 and the second clusters 86 of the FIG. 11 configuration may be converted similarly to create a radial flux configuration instead of the axial flux configuration.

Generally, the flux configurations may be different depending on the orientation of the first component 68 and the second component 74 relative to each other. That is, whether the flux is an axial flux configuration or a radial flux configuration depends on the flux direction in the gap 82A, 82B. For example, the radial flux configuration of FIG. 13 may correspond to the configuration of FIG. 5 where the arm 76 moves inwardly toward the longitudinal axis 40 and outwardly away from the longitudinal axis 40. For the axial flux configuration configurations of FIGS. 10-12, the axial flux configurations may correspond to the configurations of FIGS. 6-8, where the arm 76 moves upwardly and downwardly relative to the longitudinal axis 40.

Next, the different orientations of the first component 68 will be discussed. Generally, the first component 68 and the second component 74 may be in any suitable location, and non-limiting examples will be discussed in regards to FIGS. 3-8.

Turning to FIGS. 3 and 4, these figures generally illustrate two different mounting locations of the arm 76 relative to the first wall 38. In the configurations of FIGS. 3 and 4, the arm 76 pivots about the pivot point 70 such that the arm 76 moves axially relative to the longitudinal axis 40. That is, referring to the orientation of the arm 76 in FIGS. 3 and 4 for illustrative purposes only, the distal end 44B of the arm 76 lifts upwardly away from the second component 74, which is generally axially relative to the longitudinal axis 40.

Referring to FIG. 3, the pivot point 70 is attached to the outer surface 58 of the first wall 38. More specifically, the pivot point 70 may be attached to the inner wall portion 48 of the first wall 38, and in certain configurations, attached to the outer surface 58 of the inner wall portion 48. In this configuration, the distal end 44B of the arm 76 extends outwardly away from the proximal end 46B, and faces outwardly toward the stator 28 and away from the longitudinal axis 40. The arm 76 is movable concurrently with the first wall 38 about the longitudinal axis 40 when the electric machine 24 is in the first mode, and the arm 76 is also movable about the pivot axis 72 independently of the first wall 38. Generally, the arm 76 is disposed in the opening 52 between the inner wall portion 48 and the outer wall portion 50. The distal end 44B of the arm 76 may move into and out of the opening 52 or the distal end 44B of the arm 76 may be disposed in the space 54 between the outer wall portion 50 and the second wall 62. That is, the second length $L_2$ of the outer wall portion 50 may accommodate the distal end 44B and movement thereof.

Referring to FIG. 4, in other configurations, the pivot point 70 is attached to the inner surface 56 of the first wall 38. More specifically, the proximal end 46B of the arm 76 of the first component 68 is attached to the inner surface 56 of the first wall 38 via the pivot point 70 and the distal end 44B extends outwardly away from the proximal end 46B such that the distal end 44B is spaced apart from the first wall 38. In this configuration, the distal end 44B of the arm 76 extends outwardly toward the longitudinal axis 40 and faces inwardly toward the inner wall portion 48. The distal end 44B of the arm 76 may move into and out of the opening 52 or the distal end 44B of the arm 76 may be disposed in the space 54 between the outer wall portion 50 and the second wall 62. That is, the second length $L_2$ of the outer wall portion 50 may accommodate the distal end 44B and movement thereof. The arm 76 is movable concurrently with the first wall 38 about the longitudinal axis 40 when the electric machine 24 is in the first mode, and the arm 76 is also movable about the pivot axis 72 independently of the first wall 38.

Figure 6:
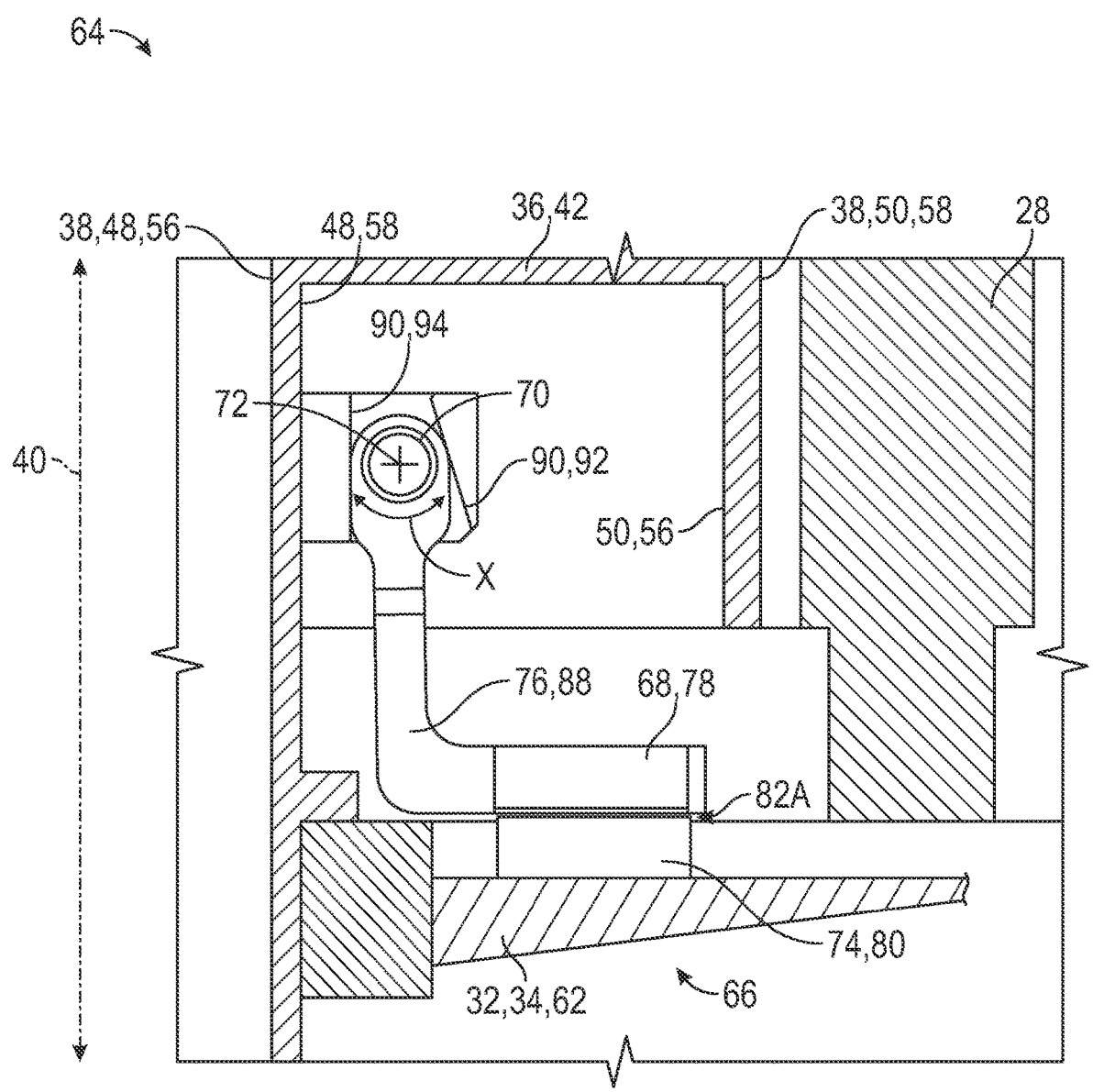
FIG. 6 is a schematic illustration of a magnetic assembly in a locked position.
Figure 8:
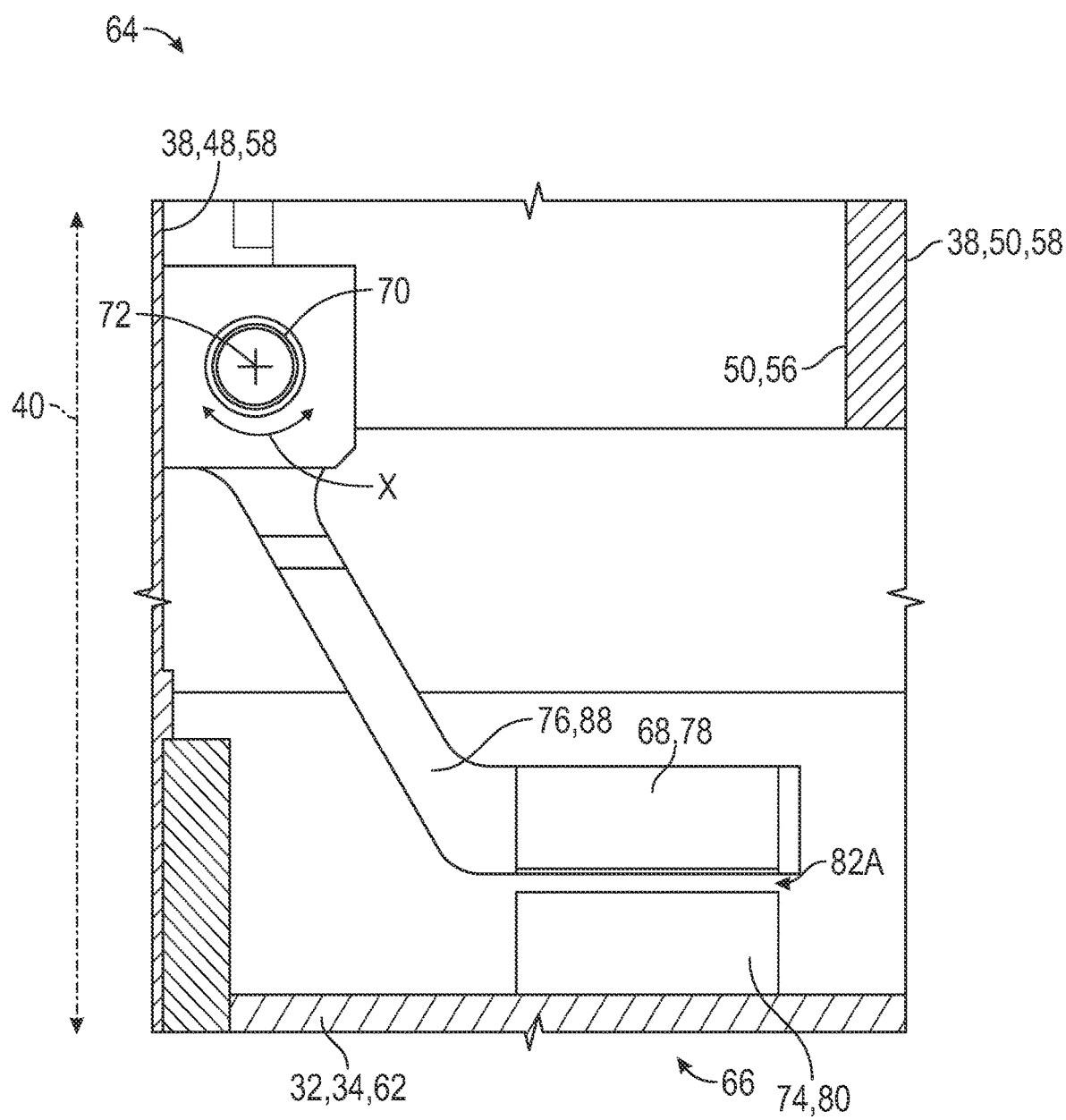
FIG. 8 is another schematic illustration of the magnetic assembly in the locked position.

Turning to FIGS. 6-8, the orientation of the arm 76 may be changed as compared to FIGS. 3 and 4. In the configuration of FIGS. 6-8, the pivot point 70 is disposed transverse to the longitudinal axis 40, and extends outwardly from the first wall 38. For example, the pivot axis 72 intersects the inner surface 56 of the first wall 38 in these configurations. As another example, the pivot axis 72 may intersect the inner surface 56 and the outer surface 58 of the first wall 38. Therefore, the arm 76 is mounted to the pivot point 70 such that the arm 76 moves substantially parallel relative to part of the first wall 38. The arm 76 is spaced apart from the inner surface 56 of the first wall 38 relative to the pivot axis 72 such that the arm 76 moves laterally alongside the inner surface 56 as the arm 76 rotates about the pivot axis 72 when the electric machine 24 is in the first mode. As such, rotation of the arm 76 is not impeded by the first wall 38. For the configurations of FIGS. 3, 4, and 6-8, generally, gravity may assist in returning the arm 76 back to the locked position. However, for the configurations of FIGS. 3, 4, and 6-8, optionally, a biasing member, such as a spring, etc., may be used to assist in returning the arm 76 back to the locked position when the electric machine 24 is shut off. Therefore, the biasing member may engage the arm 76 to assist in returning the arm 76 to the locked position.

More specifically, as shown in FIGS. 6-8, the arm 76 is disposed at least partially in the opening 52 between the inner wall portion 48 and the outer wall portion 50, and the pivot point 70 may be attached to the inner surface 56 of the outer wall portion 50. In other configurations, the arm 76 is disposed at least partially in the opening 52 between the inner wall portion 48 and the outer wall portion 50, and the pivot point 70 may be attached to the outer surface 58 of the inner wall portion 48. The distal end 44B of the arm 76 may move into and out of the opening 52 or the distal end 44B of the arm 76 may be disposed in the space 54 between the outer wall portion 50 and the second wall 62. That is, the second length $L_2$ of the outer wall portion 50 may accommodate the distal end 44B and movement thereof.

Also, the arm 76 may have a middle portion 88 disposed between the proximal end 46B and the distal end 44B. The middle portion 88 may be any suitable configuration to assist in aligning the first magnet(s) 78 with the second magnet(s) 80. Comparing FIGS. 3, 4, 6, and 7 with FIG. 8, the middle portion 88 has different configurations. FIGS. 3, 4, 6, and 7 provide a generally right-angle bend or a generally left-angle bend of the middle portion 88, while FIG. 8 illustrates a tapered bend or gradual angular bend of the middle portion 88.

Figure 5:
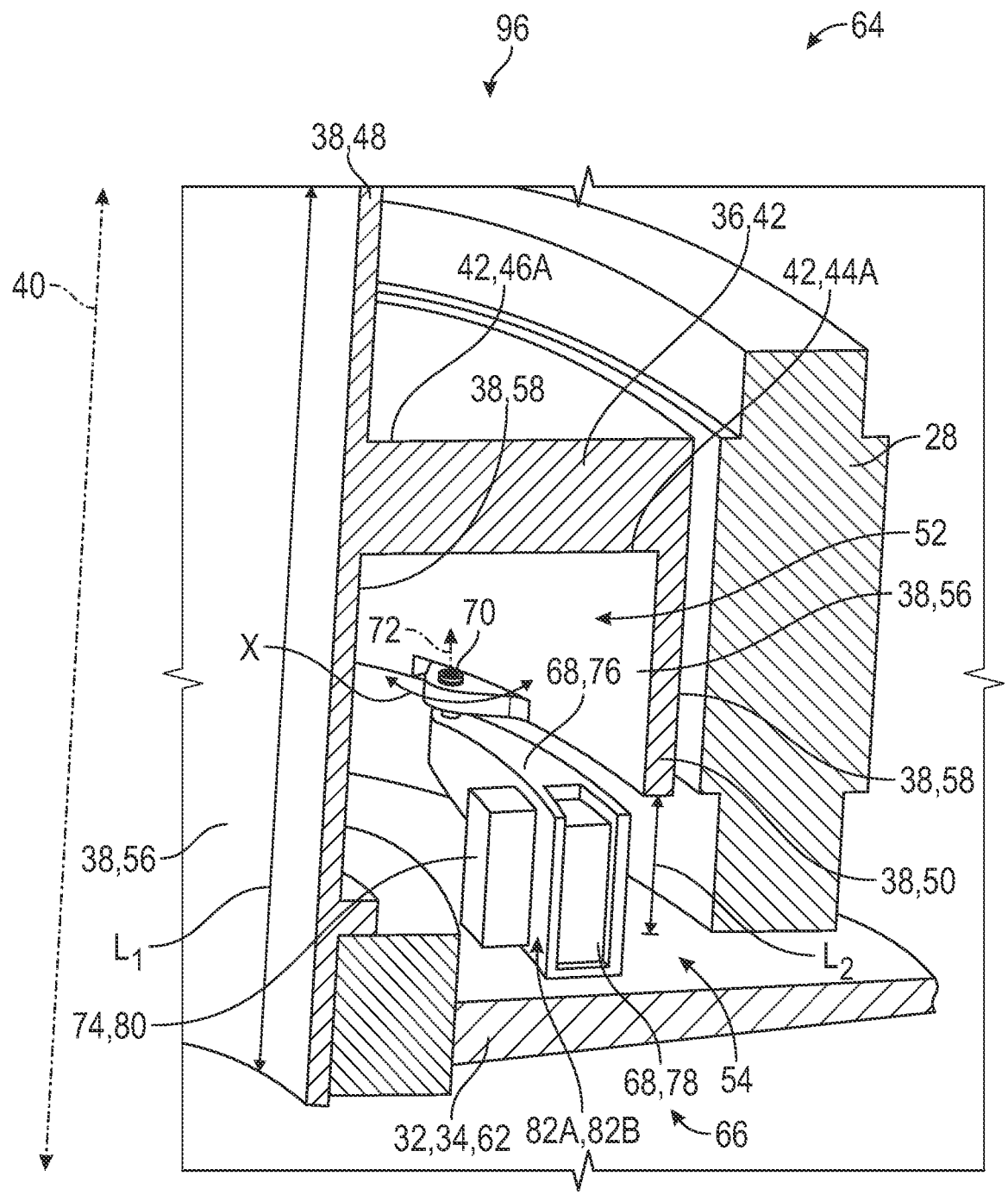
FIG. 5 is a schematic illustration of a propulsor attached to a propeller, with a locking assembly disposed in a third configuration.

Turning to FIG. 5, the orientation and the configuration of the arm 76 are different than FIGS. 3, 4, and 6-8. The arm 76 is movable concurrently with the first wall 38 about the longitudinal axis 40 when the electric machine 24 is in the first mode, and the arm 76 is also movable about the pivot axis 72 independently of the first wall 38. That is, referring to the orientation of the arm 76 in FIG. 5 for illustrative purposes only, the distal end 44B of the arm 76 moves sideways away from the second component 74, which is generally radially relative to the longitudinal axis 40.

Continuing with the configuration of FIG. 5, the pivot axis 72 is spaced apart from and is substantially parallel to the longitudinal axis 40. Here, the second component 74 extends outwardly from the second wall 62 toward the opening 52 such that the arm 76 is disposed between the second component 74 and the first wall 38. The first component 68 and the second component 74 are both disposed between the inner wall portion 48 and the outer wall portion 50 radially relative to the longitudinal axis 40. The arm 76 may be disposed in the space 54 between the first wall 38 and the second wall 62, and therefore, the first component 68 and the second component 74 are disposed between the outer surface 58 of the inner wall portion 48 and the inner surface 56 of the outer wall portion 50.

With continued reference to FIG. 5, the arm 76 is spaced apart from the first wall 38 such that the arm 76 moves closer to the inner surface 56 as the arm 76 rotates about the pivot axis 72 when the electric machine 24 is in the first mode. As the propeller rotor 30 speeds up when the electric machine 24 is in the first mode, inertia acts on the arm 76, and once the second speed threshold is reached, the arm 76 will rotate about the pivot axis 72 due to the inertia which will push the arm 76 away from the second magnet 80 and toward the inner surface 56 of the first wall 38. In the configuration of FIG. 5, this movement of the arm 76 toward the unlocked position, is toward the inner surface 56 of the outer wall portion 50 of the first wall 38. Optionally, for the configuration of FIG. 5, a biasing member, such as a spring, etc., may be used to assist in returning the arm 76 back to the locked position when the electric machine 24 is shut off. Therefore, the biasing member may engage the arm 76 to assist in returning the arm 76 to the locked position.

Referring to FIGS. 6 and 7, the first component 68 may optionally include a stop 90 disposed adjacent to the arm 76. The stop 90 limits movement of the arm 76 beyond at least one of the locked position and the unlocked position. In certain configurations, the stop 90 limits movement of the arm 76 beyond the unlocked position. In other configurations, the stop 90 limits movement of the arm 76 beyond the locked position. In yet other configurations, the stop 90 limits movement of the arm 76 beyond the locked position and the unlocked position. The stop 90 may extend outwardly from the first component 68.

The arm 76 engages or abuts the stop 90 to limit movement of the arm 76. The stop 90 may include a first stop segment 92 relative to one side of the arm 76 and a second stop segment 94 spaced from the first stop segment 92. The arm 76 is disposed between the first stop segment 92 and the second stop segment 94, and in one configuration, the proximal end 46B of the arm 76 is disposed between the first stop segment 92 and the second stop segment 94. In the example of FIGS. 6 and 7, when the arm 76 rotates to the unlocked position, rotation will be limited when the arm 76 engages the first stop segment 92, and when the arm 76 rotates to the locked position, rotation will be limited when the arm 76 engages the second stop segment 94. It is to be appreciated that any of the configurations described herein may optionally include the stop 90 even if this feature is eliminated from some of the figures.

The present disclosure also provides for a rotor assembly 96 for the aircraft 10. The rotor assembly 96 may include the propeller rotor 30 that is selectively rotatable about the longitudinal axis 40. As discussed above, one of the auxiliary propellers 26 is attached to one of the propeller rotors 30 of one of the electric machines 24. Therefore, when the electric machine 24 is energized to rotate the propeller rotor 30, the propeller rotor 30 causes the auxiliary propeller 26 to correspondingly rotate. The propeller rotor 30 and the auxiliary propeller 26 are rotatable about a respective longitudinal axis 40. That is, each of the auxiliary propellers 26 are rotatable about a respective longitudinal axis 40. As a non-limiting example, referring to FIGS. 1 and 2, there are eight auxiliary propellers 26, and each of these auxiliary propellers 26 are rotatable about a respective longitudinal axis 40.

The rotor assembly 96 may include the locking assembly 64 coupled to the propeller rotor 30 and configured to selectively lock the propeller rotor 30 in the stationary position. That is, the locking assembly 64 may prevent the propeller rotor 30 from rotating about the longitudinal axis 40, and thus, locks the propeller rotor 30 in the stationary position. As discussed above, the stationary position may be the fore-aft position of the auxiliary propellers 26. The rotor assembly 96 may include all of the locking assembly 64 features discussed above, and therefore, will not be repeated.

The present disclosure also pertains to a method of controlling the propeller rotor 30 of the aircraft 10. The method uses the locking assembly 64 to selectively lock the propeller rotor 30 in the stationary position. By locking the propeller rotor 30 in the stationary position, drag may be reduced because the auxiliary propellers 26 will not be able to free-wheel during wing-borne flight. Furthermore, the propeller rotor 30 is locked in a desired position, such as the auxiliary propeller 26 is locked in the fore-aft position to minimize drag due to the direction of the airflow A.

For illustrative purposes, the below discussion will assume that the aircraft 10 is taking off, and thus, will start in the hover phase.

To start the hover phase, the electric machine 24 is signaled, via the controller 60, to operate in the first mode to produce torque to drive rotation of the propeller rotor 30. As discussed above, the electric machine 24 includes the first wall 38 coupled to the propeller rotor 30 such that the first wall 38 and the propeller rotor 30 are rotatable together about the longitudinal axis 40 when the electric machine 24 is in the first mode. Once the second speed threshold is reached, the first component 68 moves from the locked position to the unlocked position. When this occurs, the first magnet(s) 78 and the second magnet(s) 80 further separate, and the magnetic attraction therebetween decreases, eventually to a negligible amount. The operation of the propeller rotor 30 is not affected by the magnetic assembly 66 when the locking assembly 64 is in the unlocked position.

Once the aircraft 10 reaches the cruise phase, the electric machine 24 is signaled, via the controller 60, to operate in the second mode to deenergize the electric machine 24 to stop production of the torque which causes rotation of the propeller rotor 30 to stop. As discussed above, the first wall 38 and the propeller rotor 30 become stationary relative to the longitudinal axis 40 when the electric machine 24 is in the second mode. Furthermore, the electric machine 24 includes the second wall 62 spaced apart from the first wall 38 and the second wall 62 is stationary relative to the first wall 38 regardless of the electric machine 24 being in the first mode or the second mode. Once the first speed threshold is reached, the first component 68 moves from the unlocked position to the locked position. When this occurs, the first magnet 78(s) and the second magnet(s) 80 align with each other, and the magnetic attraction therebetween increases to lock the propeller rotor 30 in the stationary position.

The locking assembly 64 is operated to selectively lock the propeller rotor 30 in the stationary position such that the first component 68 of the magnetic assembly 66 and the second component 74 of the magnetic assembly 66 align proximal to each other when the first component 68 is in the locked position in which the first component 68 and the second component 74 create the magnetic attraction therebetween to lock the first wall 38 and the propeller rotor 30 in the stationary position when the electric machine 24 is in the second mode. The first component 68 moves away from the second component 74 to the unlocked position due to rotation of the first wall 38 when the electric machine 24 is in the first mode. As discussed above, the first component 68 is coupled to the first wall 38 via the pivot point 70 and is movable relative to the pivot point 70 to the locked position and the unlocked position. The second component 74 is attached to the second wall 62.

When it is desirable to land the aircraft 10, the hover phase will again be reached, and the controller 60 will signal the electric machine 24 to switch from the second mode back to the first mode, and operate accordingly.

It is to be appreciated that the order or sequence of performing the method as discussed above is for illustrative purposes and other orders or sequences are within the scope of the present teachings. It is to also be appreciated that the method may include other features not specifically discussed above.

The present disclosure provides a light weight design that does not require any additional controls, or any additional power supply, to operate the locking assembly 64. As discussed above, there is always the gap 82A, 82B, such as an airgap, between the first magnet(s) 78 and the second magnet(s) 80, and therefore, no drag occurs between these components 68, 74. The magnetic assembly 66 may be incorporated into the electric machine 24, and therefore, further reduce the footprint of the locking assembly 64.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

As used herein, a system, apparatus, assembly, structure, article, element, component, or hardware "configured to" perform a specified function is indeed capable of performing the specified function without any alteration, rather than merely having potential to perform the specified function after further modification. In other words, the system, apparatus, assembly, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, assembly, structure, article, element, component, or hardware that enable the system, apparatus, assembly, structure, article, element, component, or hardware to perform the specified function without further modification. For purposes of this disclosure, a system, apparatus, assembly, structure, article, element, component, or hardware described as being "configured to" perform a particular function may additionally or alternatively be described as being "adapted to" and/or as being "operative to" perform that function.

The illustrations of the features described herein are intended to provide a general understanding of the structure of the various configurations. The illustrations are not intended to serve as a complete description of all of the elements and features of assemblies, systems, etc., that utilize the structures or methods described herein. Many other configurations may be apparent to those of skill in the art upon reviewing the disclosure. Other configurations may be utilized and derived from the disclosure, such that structural and logical substitutions and changes may be made without departing from the scope of the disclosure. Accordingly, the disclosure and the figures are to be regarded as illustrative rather than restrictive.

The following Clauses provide some example configurations of the locking assembly, the rotor assembly, and the method as disclosed herein.

Clause 1: A locking assembly for a propeller rotor of an aircraft, the locking assembly comprising: an electric machine having a first mode to energize the electric machine to produce torque and a second mode to deenergize the electric machine to stop production of the torque; wherein the electric machine includes a first wall rotatable about a longitudinal axis when the electric machine is in the first mode, and the first wall becomes stationary relative to the longitudinal axis when the electric machine is in the second mode; wherein the electric machine includes a second wall spaced apart from the first wall and the second wall is stationary relative to the first wall regardless of the electric machine being in the first mode or the second mode; a magnetic assembly including a first component coupled to the first wall via a pivot point, and including a second component attached to the second wall; wherein the first component is movable relative to the pivot point to a locked position and an unlocked position; and wherein the first component and the second component align proximal to each other when the first component is in the locked position such that the first component and the second component create a magnetic attraction therebetween to lock the first wall in a stationary position when the electric machine is in the second mode, and wherein the first component moves away from the second component to the unlocked position due to rotation of the first wall when the electric machine is in the first mode.

Clause 2: The locking assembly of clause 1, wherein the first component includes an arm having a proximal end attached to the first wall via the pivot point and a distal end extending outwardly away from the proximal end such that the distal end is spaced apart from the first wall.

Clause 3: The locking assembly of clause 2, wherein the first component includes at least one first magnet attached to the distal end of the arm, and the first magnet aligns proximal to the second component to create the magnetic attraction therebetween to lock the first wall in the stationary position when the first component is in the locked position.

Clause 4: The locking assembly of any of the preceding clauses, wherein: the first component includes a pivot support attached to the first wall and the pivot support extends outward from the first wall; the proximal end of the arm is movably attached to the pivot support; and the arm is rotatable about the pivot support along a pivot axis, and the pivot axis intersects the pivot support and the first wall.

Clause 5: The locking assembly of clauses 1 or 2, wherein the first component includes at least one first magnet, and the first magnet aligns proximal to the second component to create the magnetic attraction therebetween to lock the first wall in the stationary position when the first component is in the locked position.

Clause 6: The locking assembly of clause 5, wherein the second component includes at least one second magnet attached to the second wall, and the first magnet aligns proximal to the second magnet to create the magnetic attraction therebetween to lock the first wall in the stationary position when the first component is in the locked position.

Clause 7: The locking assembly of clauses 5 or 6, wherein: the first magnet and the second magnet define a first gap therebetween when the first component is in the locked position; the first magnet and the second magnet define a second gap therebetween when the first component is in the unlocked position; and the second gap is greater than the first gap.

Clause 8: The locking assembly of clauses 5, 6, or 7, wherein the at least one first magnet includes a plurality of first magnets spaced apart from each other around the first wall, and the at least one second magnet includes a plurality of second magnets spaced apart from each other around the second wall.

Clause 9: The locking assembly of any of the preceding clauses, wherein the first magnets and the second magnets are permanent magnets arranged in a Halbach array.

Clause 10: The locking assembly of any of clauses 1-3 or 5-9, wherein: the first wall includes an inner surface that faces inwardly toward the longitudinal axis and an outer surface that opposes the inner surface and faces outwardly away from the longitudinal axis; the first component includes an arm having a proximal end attached to the inner surface of the first wall via the pivot point and a distal end extending outwardly away from the proximal end such that the distal end is spaced apart from the first wall; the arm is movable concurrently with the first wall about the longitudinal axis when the electric machine is in the first mode, and the arm is also movable about a pivot axis independently of the first wall; and the pivot axis intersects the inner surface and the outer surface of the first wall.

Clause 11: The locking assembly of clause 10, wherein the arm is spaced apart from the inner surface of the first wall relative to the pivot axis such that the arm moves laterally alongside the inner surface as the arm rotates about the pivot axis when the electric machine is in the first mode.

Clause 12: The locking assembly of clause 10, wherein the arm is spaced apart from the first wall such that the arm moves closer to the inner surface as the arm rotates about the pivot axis when the electric machine is in the first mode.

Clause 13: The locking assembly of clauses 1 or 2, wherein the second component includes at least one second magnet attached to the second wall, and the first component aligns proximal to the second magnet to create the magnetic attraction therebetween to lock the first wall in the stationary position when the first component is in the locked position.

Clause 14: The locking assembly of any of the preceding clauses, wherein the electric machine includes a housing having an end cap, and wherein the second component is further defined as the end cap.

Clause 15: A rotor assembly for an aircraft, the rotor assembly comprising: a propeller rotor selectively rotatable about a longitudinal axis; a locking assembly coupled to the propeller rotor and configured to selectively lock the propeller rotor in a stationary position, the locking assembly including: an electric machine coupled to the propeller rotor and having a first mode to energize the electric machine to produce torque to drive rotation of the propeller rotor and a second mode to deenergize the electric machine to stop production of the torque which causes rotation of the propeller rotor to stop; wherein the electric machine includes a first wall coupled to the propeller rotor such that the first wall and the propeller rotor are rotatable together about the longitudinal axis when the electric machine is in the first mode, and wherein the first wall and the propeller rotor become stationary relative to the longitudinal axis when the electric machine is in the second mode; wherein the electric machine includes a second wall spaced apart from the first wall and the second wall is stationary relative to the first wall regardless of the electric machine being in the first mode or the second mode; a magnetic assembly including a first component coupled to the first wall via a pivot point, and including a second component attached to the second wall; wherein the first component is movable relative to the pivot point to a locked position and an unlocked position; and wherein the first component and the second component align proximal to each other when the first component is in the locked position such that the first component and the second component create a magnetic attraction therebetween to lock the first wall and the propeller rotor in the stationary position when the electric machine is in the second mode, and wherein the first component moves away from the second component to the unlocked position due to rotation of the first wall when the electric machine is in the first mode.

Clause 16: The rotor assembly of clause 15, wherein: the electric machine includes a fan blade structure configured to dissipate heat inside of the electric machine; the first wall surrounds the fan blade structure and is attached to the fan blade structure; the first wall includes an inner surface that faces inwardly toward the longitudinal axis; the first component includes an arm having a proximal end attached to the inner surface of the first wall via the pivot point and a distal end extending outwardly away from the proximal end such that the distal end is spaced apart from the first wall; the arm is movable concurrently with the first wall about the longitudinal axis when the electric machine is in the first mode, and the arm is also movable about a pivot axis independently of the first wall; and the pivot axis intersects the inner surface.

Clause 17: The rotor assembly of clauses 15 or 16, wherein the first component includes a stop disposed adjacent to the arm, and the stop limits movement of the arm beyond at least one of the locked position and the unlocked position.

Clause 18: The rotor assembly of clauses 15, 16, or 17, wherein: the first component includes a plurality of first magnets spaced apart from each other around the first wall; the second component includes a plurality of second magnets spaced apart from each other around the second wall; respective first magnets and respective second magnets define a first gap therebetween when the first component is in the locked position; the respective first magnets and the respective second magnets define a second gap therebetween when the first component is in the unlocked position; and the second gap of the respective first magnets and the respective second magnets is greater than the first gap of the respective first magnets and the respective second magnets.

Clause 19: The rotor assembly of any one of clauses 15-18, wherein: the first magnets are separated into a plurality of first clusters each having two or more of the first magnets, and each of the first clusters are spaced from each other around the first wall; the second magnets are separated into a plurality of second clusters each having two or more of the second magnets; and the first clusters and the second clusters create a permanent magnet array.

Clause 20: A method of controlling a propeller rotor of an aircraft, the method comprising: signaling, via a controller, an electric machine to operate in a first mode to produce torque to drive rotation of the propeller rotor, wherein the electric machine includes a first wall coupled to the propeller rotor such that the first wall and the propeller rotor are rotatable together about a longitudinal axis when the electric machine is in the first mode; signaling, via the controller, the electric machine to operate in a second mode to deenergize the electric machine to stop production of the torque which causes rotation of the propeller rotor to stop, wherein the first wall and the propeller rotor become stationary relative to the longitudinal axis when the electric machine is in the second mode, and wherein the electric machine includes a second wall spaced apart from the first wall and the second wall is stationary relative to the first wall regardless of the electric machine being in the first mode or the second mode; and operating a locking assembly to selectively lock the propeller rotor in a stationary position such that a first component of a magnetic assembly and a second component of the magnetic assembly align proximal to each other when the first component is in a locked position in which the first component and the second component create a magnetic attraction therebetween to lock the first wall and the propeller rotor in the stationary position when the electric machine is in the second mode, and wherein the first component moves away from the second component to an unlocked position due to rotation of the first wall when the electric machine is in the first mode, wherein the first component is coupled to the first wall via a pivot point and movable relative to the pivot point to the locked position and the unlocked position, and the second component is attached to the second wall.

What is claimed is:

1. A locking assembly for a propeller rotor of an aircraft, the locking assembly comprising:

an electric machine having a first mode to energize the electric machine to produce torque and a second mode to deenergize the electric machine to stop production of the torque;

wherein the electric machine includes a first wall rotatable about a longitudinal axis when the electric machine is in the first mode, and the first wall becomes stationary relative to the longitudinal axis when the electric machine is in the second mode;

wherein the electric machine includes a second wall spaced apart from the first wall and the second wall is stationary relative to the first wall regardless of the electric machine being in the first mode or the second mode;

a magnetic assembly including a first component coupled to the first wall via a pivot point, and including a second component attached to the second wall;

wherein the first component is movable relative to the pivot point to a locked position and an unlocked position; and wherein the first component and the second component align proximal to each other when the first component is in the locked position such that the first component and the second component create a magnetic attraction therebetween to lock the first wall in a stationary position when the electric machine is in the second mode, and wherein the first component moves away from the second component to the unlocked position due to rotation of the first wall when the electric machine is in the first mode.

2. The locking assembly of claim 1, wherein the first component includes an arm having a proximal end attached to the first wall via the pivot point and a distal end extending outwardly away from the proximal end such that the distal end is spaced apart from the first wall.

3. The locking assembly of claim 2, wherein the first component includes at least one first magnet attached to the distal end of the arm, and the first magnet aligns proximal to the second component to create the magnetic attraction therebetween to lock the first wall in the stationary position when the first component is in the locked position.

4. The locking assembly of claim 3, wherein:
the first component includes a pivot support attached to the first wall and the pivot support extends outward from the first wall;
the proximal end of the arm is movably attached to the pivot support; and
the arm is rotatable about the pivot support along a pivot axis, and the pivot axis intersects the pivot support and the first wall.

5. The locking assembly of claim 1, wherein the first component includes at least one first magnet, and the first magnet aligns proximal to the second component to create the magnetic attraction therebetween to lock the first wall in the stationary position when the first component is in the locked position.

6. The locking assembly of claim 5, wherein the second component includes at least one second magnet attached to the second wall, and the first magnet aligns proximal to the second magnet to create the magnetic attraction therebetween to lock the first wall in the stationary position when the first component is in the locked position.

7. The locking assembly of claim 6, wherein:
the first magnet and the second magnet define a first gap therebetween when the first component is in the locked position;
the first magnet and the second magnet define a second gap therebetween when the first component is in the unlocked position; and
the second gap is greater than the first gap.

8. The locking assembly of claim 6, wherein the at least one first magnet includes a plurality of first magnets spaced apart from each other around the first wall, and the at least one second magnet includes a plurality of second magnets spaced apart from each other around the second wall.

9. The locking assembly of claim 8, wherein the first magnets and the second magnets are permanent magnets arranged in a Halbach array.

10. The locking assembly of claim 1, wherein:
the first wall includes an inner surface that faces inwardly toward the longitudinal axis and an outer surface that opposes the inner surface and faces outwardly away from the longitudinal axis;
the first component includes an arm having a proximal end attached to the inner surface of the first wall via the pivot point and a distal end extending outwardly away from the proximal end such that the distal end is spaced apart from the first wall;
the arm is movable concurrently with the first wall about the longitudinal axis when the electric machine is in the first mode, and the arm is also movable about a pivot axis independently of the first wall; and
the pivot axis intersects the inner surface and the outer surface of the first wall.

11. The locking assembly of claim 10, wherein the arm is spaced apart from the inner surface of the first wall relative to the pivot axis such that the arm moves laterally alongside the inner surface as the arm rotates about the pivot axis when the electric machine is in the first mode.

12. The locking assembly of claim 10, wherein the arm is spaced apart from the first wall such that the arm moves closer to the inner surface as the arm rotates about the pivot axis when the electric machine is in the first mode.

13. The locking assembly of claim 1, wherein the second component includes at least one second magnet attached to the second wall, and the first component aligns proximal to the second magnet to create the magnetic attraction therebetween to lock the first wall in the stationary position when the first component is in the locked position.

14. The locking assembly of claim 1, wherein the electric machine includes a housing having an end cap, and wherein the second component is further defined as the end cap.

15. A rotor assembly for an aircraft, the rotor assembly comprising:
a propeller rotor selectively rotatable about a longitudinal axis;
a locking assembly coupled to the propeller rotor and configured to selectively lock the propeller rotor in a stationary position, the locking assembly including:
an electric machine coupled to the propeller rotor and having a first mode to energize the electric machine to produce torque to drive rotation of the propeller rotor and a second mode to deenergize the electric machine to stop production of the torque which causes rotation of the propeller rotor to stop;
wherein the electric machine includes a first wall coupled to the propeller rotor such that the first wall and the propeller rotor are rotatable together about the longitudinal axis when the electric machine is in the first mode, and wherein the first wall and the propeller rotor become stationary relative to the longitudinal axis when the electric machine is in the second mode;

wherein the electric machine includes a second wall spaced apart from the first wall and the second wall is stationary relative to the first wall regardless of the electric machine being in the first mode or the second mode;

a magnetic assembly including a first component coupled to the first wall via a pivot point, and including a second component attached to the second wall;

wherein the first component is movable relative to the pivot point to a locked position and an unlocked position; and wherein the first component and the second component align proximal to each other when the first component is in the locked position such that the first component and the second component create a magnetic attraction therebetween to lock the first wall and the propeller rotor in the stationary position when the electric machine is in the second mode, and wherein the first component moves away from the second component to the unlocked position due to rotation of the first wall when the electric machine is in the first mode.

16. The rotor assembly of claim 15, wherein:
the electric machine includes a fan blade structure configured to dissipate heat inside of the electric machine;
the first wall surrounds the fan blade structure and is attached to the fan blade structure;
the first wall includes an inner surface that faces inwardly toward the longitudinal axis;
the first component includes an arm having a proximal end attached to the inner surface of the first wall via the pivot point and a distal end extending outwardly away from the proximal end such that the distal end is spaced apart from the first wall;
the arm is movable concurrently with the first wall about the longitudinal axis when the electric machine is in the first mode, and the arm is also movable about a pivot axis independently of the first wall; and
the pivot axis intersects the inner surface.

17. The rotor assembly of claim 16, wherein the first component includes a stop disposed adjacent to the arm, and the stop limits movement of the arm beyond at least one of the locked position and the unlocked position.

18. The rotor assembly of claim 15, wherein:
the first component includes a plurality of first magnets spaced apart from each other around the first wall;
the second component includes a plurality of second magnets spaced apart from each other around the second wall;
respective first magnets and respective second magnets define a first gap therebetween when the first component is in the locked position;

the respective first magnets and the respective second magnets define a second gap therebetween when the first component is in the unlocked position; and
the second gap of the respective first magnets and the respective second magnets is greater than the first gap of the respective first magnets and the respective second magnets.

19. The rotor assembly of claim 18, wherein:
the first magnets are separated into a plurality of first clusters each having two or more of the first magnets, and each of the first clusters are spaced from each other around the first wall;
the second magnets are separated into a plurality of second clusters each having two or more of the second magnets; and
the first clusters and the second clusters create a permanent magnet array.

20. A method of controlling a propeller rotor of an aircraft, the method comprising:
signaling, via a controller, an electric machine to operate in a first mode to produce torque to drive rotation of the propeller rotor, wherein the electric machine includes a first wall coupled to the propeller rotor such that the first wall and the propeller rotor are rotatable together about a longitudinal axis when the electric machine is in the first mode;
signaling, via the controller, the electric machine to operate in a second mode to deenergize the electric machine to stop production of the torque which causes rotation of the propeller rotor to stop, wherein the first wall and the propeller rotor become stationary relative to the longitudinal axis when the electric machine is in the second mode, and wherein the electric machine includes a second wall spaced apart from the first wall and the second wall is stationary relative to the first wall regardless of the electric machine being in the first mode or the second mode; and
operating a locking assembly to selectively lock the propeller rotor in a stationary position such that a first component of a magnetic assembly and a second component of the magnetic assembly align proximal to each other when the first component is in a locked position in which the first component and the second component create a magnetic attraction therebetween to lock the first wall and the propeller rotor in the stationary position when the electric machine is in the second mode, and wherein the first component moves away from the second component to an unlocked position due to rotation of the first wall when the electric machine is in the first mode, wherein the first component is coupled to the first wall via a pivot point and movable relative to the pivot point to the locked position and the unlocked position, and the second component is attached to the second wall.

* * * * *